US012627337B2

(12) United States Patent
Yuan et al.

(10) Patent No.: US 12,627,337 B2
(45) Date of Patent: May 12, 2026

(54) TECHNIQUES FOR NETWORK-INITIATED PANEL ACTIVATION OR DEACTIVATION AT A USER EQUIPMENT (UE)

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 307 days.

(21) Appl. No.: 18/252,704

(22) PCT Filed: Jan. 28, 2021

(86) PCT No.: PCT/CN2021/074103
§ 371 (c)(1),
(2) Date: May 11, 2023

(87) PCT Pub. No.: WO2022/160168
PCT Pub. Date: Aug. 4, 2022

(65) Prior Publication Data
US 2024/0007149 A1    Jan. 4, 2024

(51) Int. Cl.
*H04B 7/0404*        (2017.01)
*H04B 7/06*          (2006.01)
(52) U.S. Cl.
CPC ......... *H04B 7/0404* (2013.01); *H04B 7/0602* (2013.01)

(58) Field of Classification Search
CPC ........................... H04B 7/0404; H04B 7/0602
See application file for complete search history.

(56) References Cited

U.S. PATENT DOCUMENTS

| | | | | |
|---|---|---|---|---|
| 2020/0358585 A1* | 11/2020 | Ryu | ................... | H04B 7/06956 |
| 2021/0119688 A1* | 4/2021 | Enescu | ................. | H04B 7/088 |
| 2021/0168714 A1* | 6/2021 | Guan | ..................... | H04W 52/16 |
| 2022/0248411 A1* | 8/2022 | Jung | ........................ | H04B 7/06 |
| 2022/0377810 A1* | 11/2022 | Bhamri | ................ | H04B 7/0695 |
| 2023/0080333 A1* | 3/2023 | Li | ......................... | H04B 7/0802 |
| | | | | 375/267 |
| 2023/0142007 A1* | 5/2023 | Matsumura | ........... | H04W 88/02 |
| | | | | 375/262 |

(Continued)

OTHER PUBLICATIONS

International Search Report and Written Opinion—PCT/CN2021/074103—ISA/EPO—Aug. 30, 2021.

(Continued)

*Primary Examiner* — Hashim S Bhatti
(74) *Attorney, Agent, or Firm* — Holland & Hart LLP

(57) ABSTRACT

Methods, systems, and devices for wireless communications are described. In some example, a base station may facilitate panel activation or deactivation at a user equipment (UE). For example, a UE including a set of panels may establish a connection with a base station. The base station may transmit an activation configuration message activating or deactivating a subset of panels at the UE. Based on the activation configuration message, the UE may select one or more panels from the set of panels and transmit an uplink transmission to the base station using the selected one or more panels.

14 Claims, 19 Drawing Sheets

(56)  References Cited

U.S. PATENT DOCUMENTS

2023/0142391 A1 *   5/2023   Matsumura ........ H04B 7/06956
                                          375/262
2023/0328664 A1 * 10/2023   Tang ................. H04W 56/0015
                                          370/318

OTHER PUBLICATIONS

Partial International Search Report—PCT/CN2021/074103—ISA/
EPO —Jul. 9, 2021.

* cited by examiner

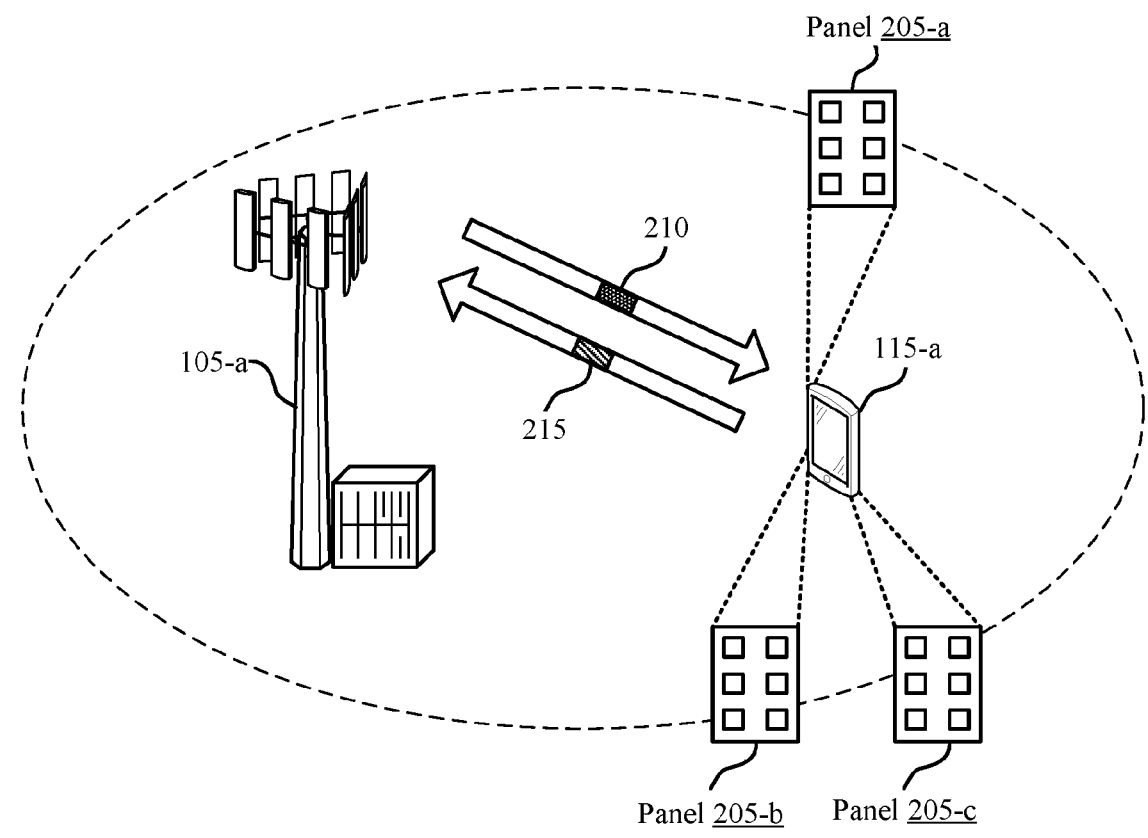
Panel 205-a
210
215
105-a
115-a
Panel 205-b    Panel 205-c
 Activation Configuration Message 210
Uplink Tranmission 215
200
FIG. 2

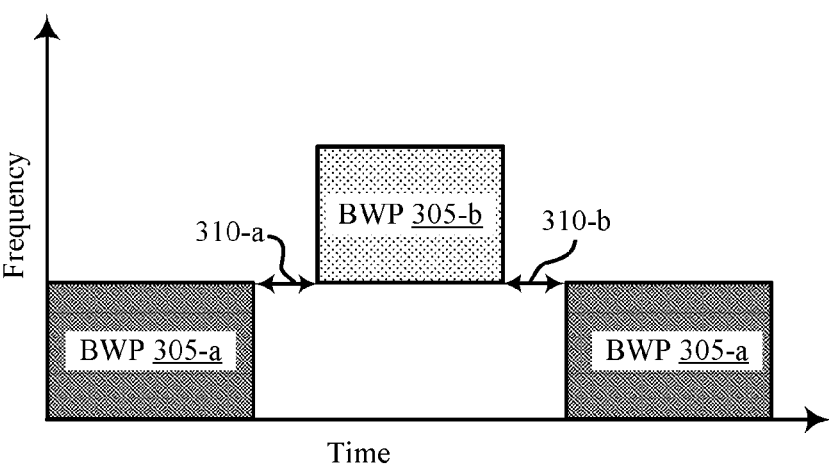
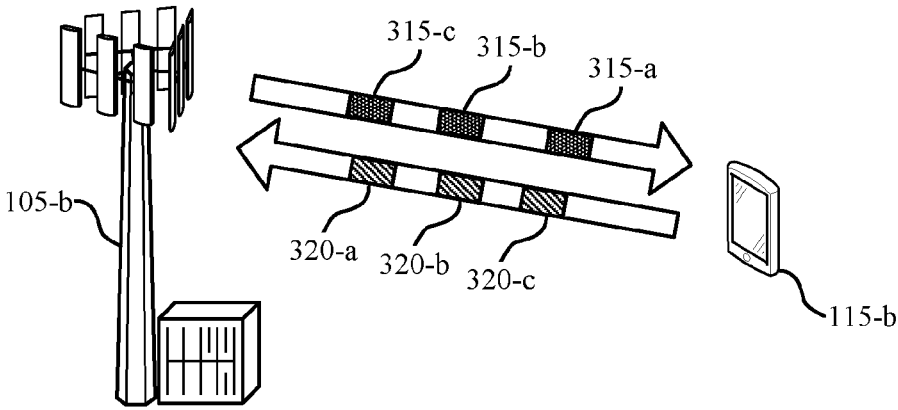
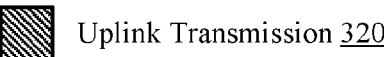 Activation Configuration Message 315
Uplink Transmission 320
300
FIG. 3

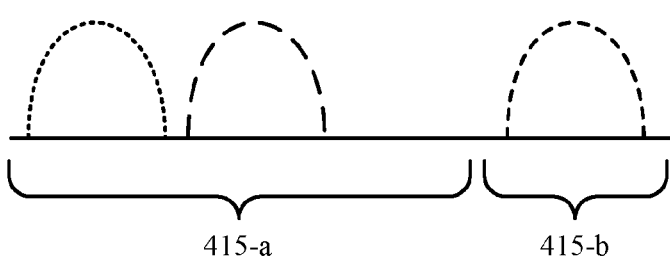
415-a      415-b
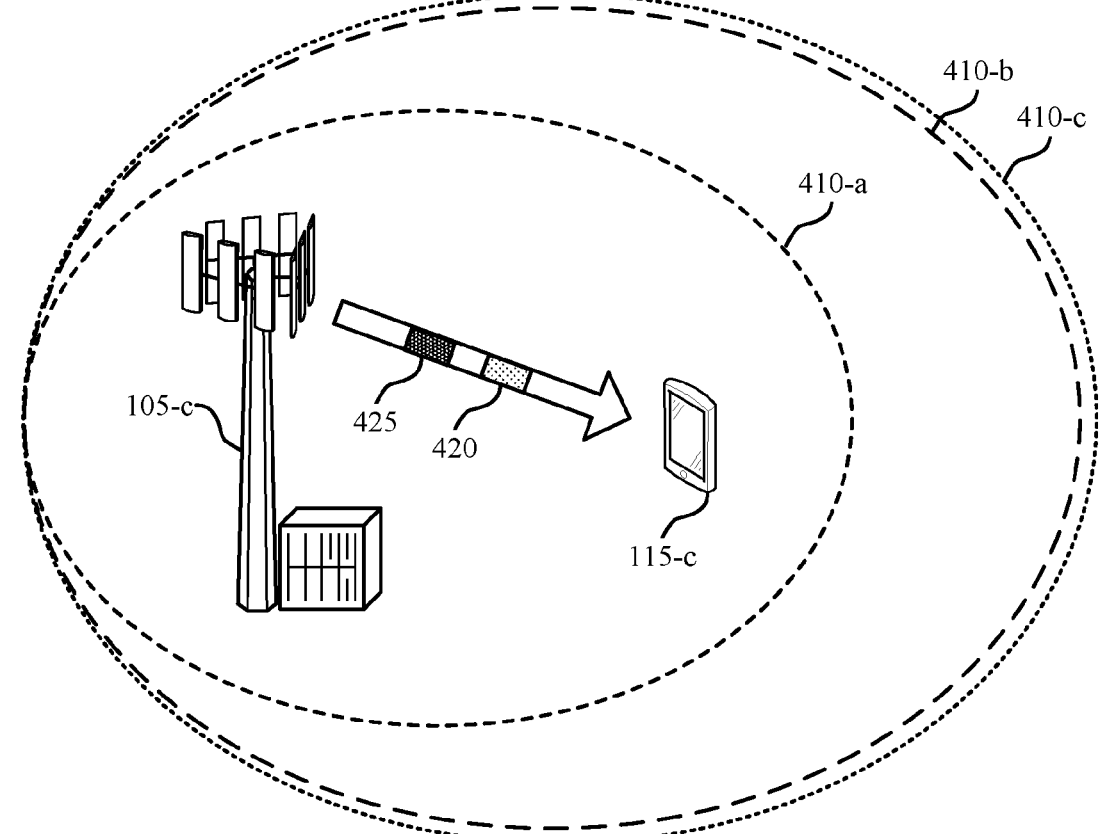
410-b
410-c
410-a
105-c
425   420
115-c
 Control Message 420
 Activation Configuration Message 425
400
FIG. 4

115-d 105-d

Establishing Connection

505

Activation Configuration Message

510

515  Select A Panel

520  Uplink Transmission

525  BWP Switch

BWP Switch  525

500

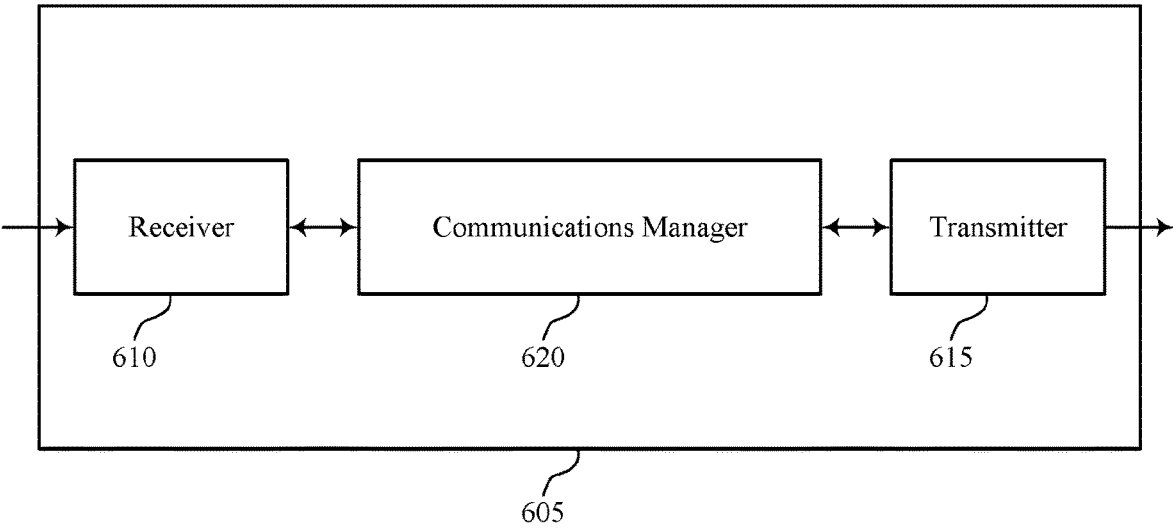
610
620
615
605
600
FIG. 6

1010

1020

1015

1005

1000

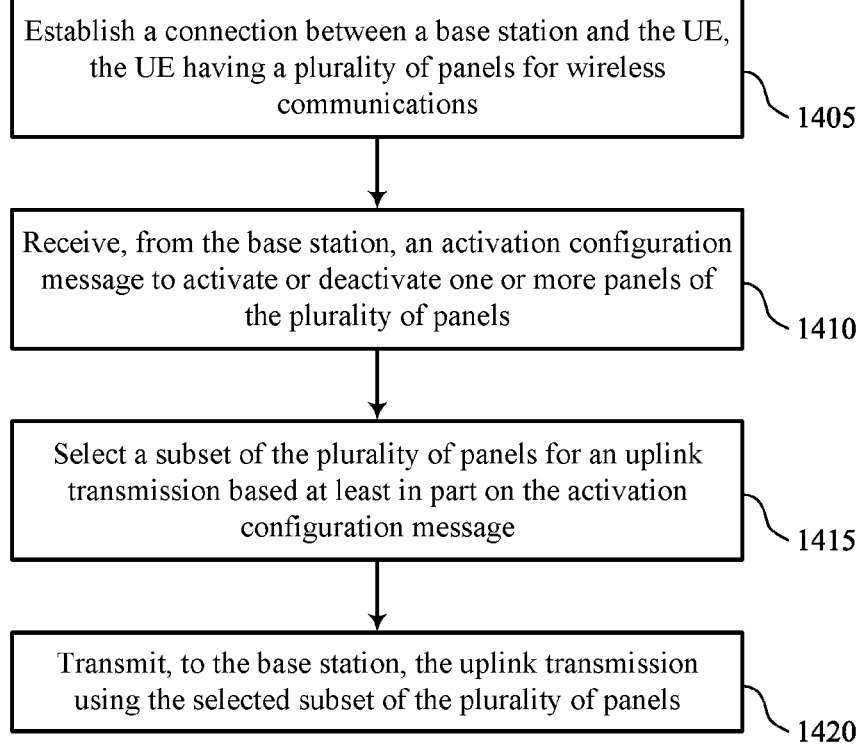

Establish a connection between a base station and the UE, the UE having a plurality of panels for wireless communications

1405

Receive, from the base station, an activation configuration message to activate or deactivate one or more panels of the plurality of panels

1410

Select a subset of the plurality of panels for an uplink transmission based at least in part on the activation configuration message

1415

Transmit, to the base station, the uplink transmission using the selected subset of the plurality of panels

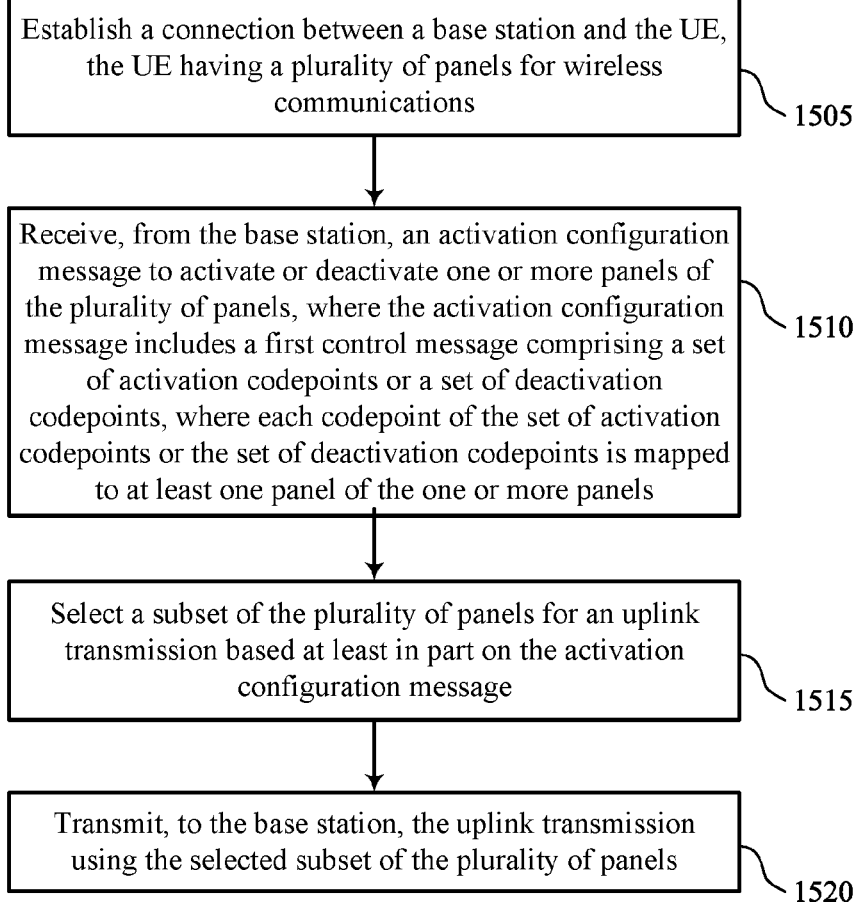

Establish a connection between a base station and the UE, the UE having a plurality of panels for wireless communications ⟍ 1505

Receive, from the base station, an activation configuration message to activate or deactivate one or more panels of the plurality of panels, where the activation configuration message includes a first control message comprising a set of activation codepoints or a set of deactivation codepoints, where each codepoint of the set of activation codepoints or the set of deactivation codepoints is mapped to at least one panel of the one or more panels ⟍ 1510

Select a subset of the plurality of panels for an uplink transmission based at least in part on the activation configuration message ⟍ 1515

Transmit, to the base station, the uplink transmission using the selected subset of the plurality of panels ⟍ 1520

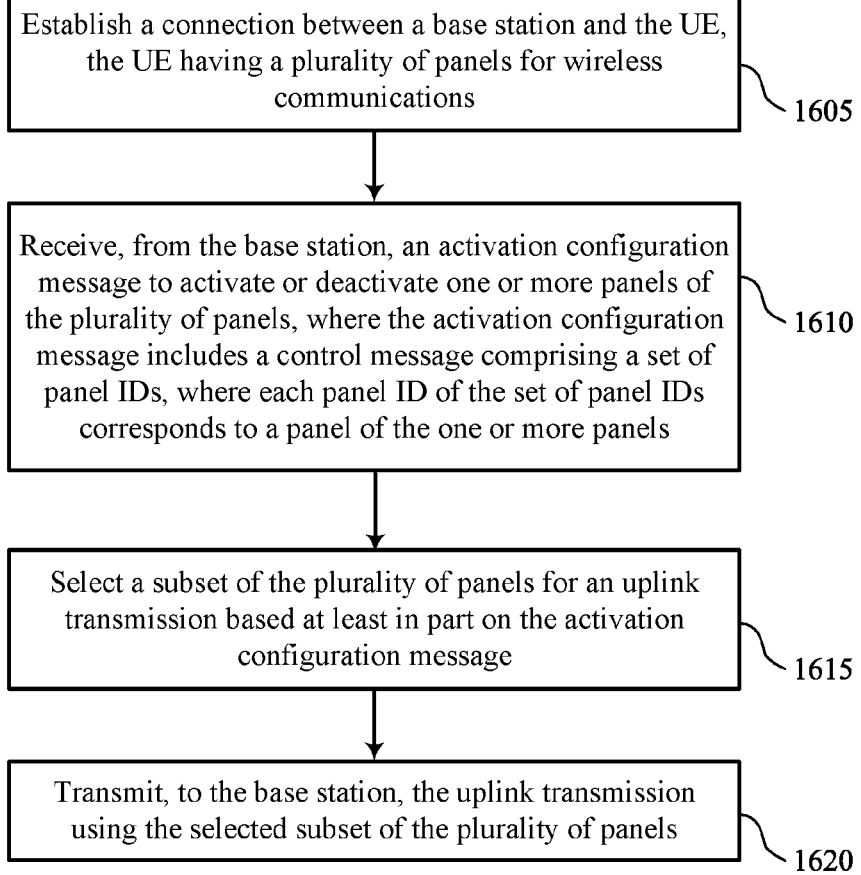

Establish a connection between a base station and the UE, the UE having a plurality of panels for wireless communications

1605

Receive, from the base station, an activation configuration message to activate or deactivate one or more panels of the plurality of panels, where the activation configuration message includes a control message comprising a set of panel IDs, where each panel ID of the set of panel IDs corresponds to a panel of the one or more panels

1610

Select a subset of the plurality of panels for an uplink transmission based at least in part on the activation configuration message

1615

Transmit, to the base station, the uplink transmission using the selected subset of the plurality of panels

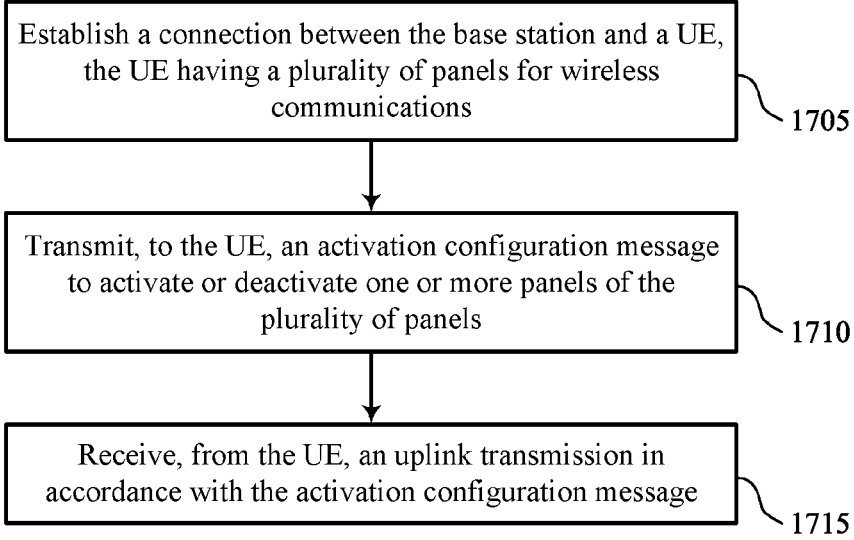

```
┌─────────────────────────────────────────────────────┐
│ Establish a connection between the base station and a │
│ UE, the UE having a plurality of panels for wireless  │
│ communications                                        │
└─────────────────────────────────────────────────────┘  ⟍ 1705

┌─────────────────────────────────────────────────────┐
│ Transmit, to the UE, an activation configuration      │
│ message to activate or deactivate one or more panels  │
│ of the plurality of panels                            │
└─────────────────────────────────────────────────────┘  ⟍ 1710

┌─────────────────────────────────────────────────────┐
│ Receive, from the UE, an uplink transmission in       │
│ accordance with the activation configuration message  │
└─────────────────────────────────────────────────────┘  ⟍ 1715
```

TECHNIQUES FOR NETWORK-INITIATED PANEL ACTIVATION OR DEACTIVATION AT A USER EQUIPMENT (UE)

CROSS REFERENCE

The present application is a 371 national stage filing of International PCT Application No. PCT/CN2021/074103 by Yuan et al. entitled "TECHNIQUES FOR NETWORK-INITIATED PANEL ACTIVATION OR DEACTIVATION AT A USER EQUIPMENT (UE)," filed Jan. 28, 2021, which is assigned to the assignee hereof, and which is expressly incorporated by reference in its entirety herein.

FIELD OF TECHNOLOGY

The following relates to wireless communications, including techniques for network-initiated panel activation or deactivation at a user equipment (UE).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a UE may communicate with a base station using a set of panels. For example, the UE may activate one or more panels of the set and transmit uplink transmissions to the base station using the one or more activated panels. In some examples, the UE may autonomously select which panels of the set to activate or deactivate, which may result in increased UE complexity.

SUMMARY

The described techniques relate to improved methods, systems, devices, and apparatuses that support techniques for network-initiated panel activation or deactivation at a user equipment (UE). Generally, the described techniques provide for a base station to instruct a UE to activate or deactivate a subset of panels for one or more uplink transmissions. For example, the base station may transmit an activation configuration message to the UE indicating one or more panels for which the UE may activate or deactivate. In response to the activation configuration message, the UE may activate or deactivate the indicated panels and select a panel for one or more uplink transmission to the base station based on the activation configuration message.

A method for wireless communication at a UE is described. The method may include establishing a connection between a base station and the UE, the UE having a set of multiple panels for wireless communications, receiving, from the base station, an activation configuration message to activate or deactivate one or more panels of the set of multiple panels, selecting a subset of the set of multiple panels for an uplink transmission based on the activation configuration message, and transmitting, to the base station, the uplink transmission using the selected subset of the set of multiple panels.

An apparatus for wireless communication at a UE is described. The apparatus may include a processor, memory coupled with the processor, and instructions stored in the memory. The instructions may be executable by the processor to cause the apparatus to establish a connection between a base station and the UE, the UE having a set of multiple panels for wireless communications, receive, from the base station, an activation configuration message to activate or deactivate one or more panels of the set of multiple panels, select a subset of the set of multiple panels for an uplink transmission based on the activation configuration message, and transmit, to the base station, the uplink transmission using the selected subset of the set of multiple panels.

Another apparatus for wireless communication at a UE is described. The apparatus may include means for establishing a connection between a base station and the UE, the UE having a set of multiple panels for wireless communications, means for receiving, from the base station, an activation configuration message to activate or deactivate one or more panels of the set of multiple panels, means for selecting a subset of the set of multiple panels for an uplink transmission based on the activation configuration message, and means for transmitting, to the base station, the uplink transmission using the selected subset of the set of multiple panels.

A non-transitory computer-readable medium storing code for wireless communication at a UE is described. The code may include instructions executable by a processor to establish a connection between a base station and the UE, the UE having a set of multiple panels for wireless communications, receive, from the base station, an activation configuration message to activate or deactivate one or more panels of the set of multiple panels, select a subset of the set of multiple panels for an uplink transmission based on the activation configuration message, and transmit, to the base station, the uplink transmission using the selected subset of the set of multiple panels.

In some examples of the method, apparatuses, and non-transitory computer-readable medium described herein, receiving the activation configuration message may include operations, features, means, or instructions for receiving a control message including a bit field for each of the one or more panels, where each bit field includes one of a bit for activating a respective panel of the one or more panels or a bit for deactivating a respective panel of the one or more panels.

In some examples of the method, apparatuses, and non-transitory computer-readable medium described herein, receiving the activation configuration message may include operations, features, means, or instructions for receiving a control message including a single bit field for the one or more panels, where the bit field includes one of a bit for activating the one or more panels or a bit for deactivating the one or more panels.

In some examples of the method, apparatuses, and non-transitory computer-readable medium described herein, receiving the activation configuration message may include operations, features, means, or instructions for receiving a first control message including a set of activation codepoints or a set of deactivation codepoints, where each codepoint of the set of activation codepoints or the set of deactivation codepoints may be mapped to at least one panel of the one or more panels.

Some examples of the method, apparatuses, and non-transitory computer-readable medium described herein may further include operations, features, means, or instructions for receiving, before receiving the first control message, a second control message indicating the mapping between each codepoint of the set of activation codepoints or the set of deactivation codepoints and the at least one panel of the one or more panels.

In some examples of the method, apparatuses, and non-transitory computer-readable medium described herein, receiving the activation configuration message may include operations, features, means, or instructions for receiving a control message including a set of panel identifiers (IDs), where each panel ID of the set of panel IDs corresponds to a panel of the one or more panels.

Some examples of the method, apparatuses, and non-transitory computer-readable medium described herein may further include operations, features, means, or instructions for receiving a second activation configuration message to activate one or more second panels different from the one or more panels and deactivating the one or more panels based on the second activation configuration message.

Some examples of the method, apparatuses, and non-transitory computer-readable medium described herein may further include operations, features, means, or instructions for communicating with the base station using a first bandwidth part (BWP), where the activation configuration message may be received over the first BWP, switching from communicating with the base station using the first BWP to the communicating with the base station using a second BWP, and selecting a second subset of the set of multiple panels for a second uplink transmission using the second BWP based on the activation configuration message.

Some examples of the method, apparatuses, and non-transitory computer-readable medium described herein may further include operations, features, means, or instructions for communicating with the base station using a first BWP, where the activation configuration message may be received over the first BWP, switching from communicating with the base station using the first BWP to the communicating with the base station using a second BWP, receiving a second activation configuration message to activate or deactivate one or more second panels of the set of multiple panels, where the second activation configuration message may be received over the second BWP, and selecting a second subset of the set of multiple panels for a second uplink transmission using the second BWP based on the second activation configuration message.

Some examples of the method, apparatuses, and non-transitory computer-readable medium described herein may further include operations, features, means, or instructions for switching from communicating with the base station using the second BWP to communicating with the base station using the first BWP and selecting a third subset of the set of multiple panels for a third uplink transmission using the first BWP based on the activation configuration message.

Some examples of the method, apparatuses, and non-transitory computer-readable medium described herein may further include operations, features, means, or instructions for receiving a control message indicating a set of component carriers (CCs) of a group of serving cells configured for the UE, where the activation configuration message includes a message to activate or deactivate the one or more panels when communicating using a CC of the set of CCs and communicating with the base station using the CC of the set of CCs and the selected subset of the set of multiple panels of the set of multiple panels based on the activation configuration message.

In some examples of the method, apparatuses, and non-transitory computer-readable medium described herein, the activation configuration message includes a radio resource control (RRC) message, a medium access control control element (MAC-CE), or a downlink control information (DCI) message.

A method is described. The method may include establishing a connection between the base station and a UE, the UE having a set of multiple panels for wireless communications, transmitting, to the UE, an activation configuration message to activate or deactivate one or more panels of the set of multiple panels, and receiving, from the UE, an uplink transmission in accordance with the activation configuration message.

An apparatus is described. The apparatus may include a processor, memory coupled with the processor, and instructions stored in the memory. The instructions may be executable by the processor to cause the apparatus to establish a connection between the base station and a UE, the UE having a set of multiple panels for wireless communications, transmit, to the UE, an activation configuration message to activate or deactivate one or more panels of the set of multiple panels, and receive, from the UE, an uplink transmission in accordance with the activation configuration message.

Another apparatus is described. The apparatus may include means for establishing a connection between the base station and a UE, the UE having a set of multiple panels for wireless communications, means for transmitting, to the UE, an activation configuration message to activate or deactivate one or more panels of the set of multiple panels, and means for receiving, from the UE, an uplink transmission in accordance with the activation configuration message.

A non-transitory computer-readable medium storing code is described. The code may include instructions executable by a processor to establish a connection between the base station and a UE, the UE having a set of multiple panels for wireless communications, transmit, to the UE, an activation configuration message to activate or deactivate one or more panels of the set of multiple panels, and receive, from the UE, an uplink transmission in accordance with the activation configuration message.

Some examples of the method, apparatuses, and non-transitory computer-readable medium described herein may further include operations, features, means, or instructions for transmitting a control message including a bit field for each of the one or more panels, where each bit field includes one of a bit for activating a respective panel of the one or more panels or a bit for deactivating a respective panel of the one or more panels.

In some examples of the method, apparatuses, and non-transitory computer-readable medium described herein, transmitting the activation configuration message may include operations, features, means, or instructions for transmitting a control message including a single bit field for the one or more panels, where the single bit field including one of a bit for activating the one or more panels or a bit for deactivating the one or more panels.

In some examples of the method, apparatuses, and non-transitory computer-readable medium described herein, transmitting the activation configuration message may include operations, features, means, or instructions for transmitting a first control message including a set of activation codepoints or a set of deactivation codepoints, where each codepoint of the set of activation codepoints or the set of deactivation codepoints may be mapped to at least one panel of the one or more panels.

Some examples of the method, apparatuses, and non-transitory computer-readable medium described herein may further include operations, features, means, or instructions for transmitting, before transmitting the first control message, a second control message indicating the mapping between each codepoint of the set of activation codepoints or the set of deactivation codepoints and the at least one panel of the one or more panels.

In some examples of the method, apparatuses, and non-transitory computer-readable medium described herein, transmitting the activation configuration message may include operations, features, means, or instructions for transmitting a control message including a set of panel IDs, where each panel ID of the set of panel IDs corresponds to one panel of the one or more panels.

Some examples of the method, apparatuses, and non-transitory computer-readable medium described herein may further include operations, features, means, or instructions for transmitting a second activation configuration message to activate one or more second panels different from the one or more panels and receiving a second uplink transmission from the UE in accordance with the second activation configuration message.

Some examples of the method, apparatuses, and non-transitory computer-readable medium described herein may further include operations, features, means, or instructions for communicating with the UE using a first BWP, where the activation configuration message may be transmitted over the first BWP, switching from communicating with the UE using the first BWP to communicating with the UE using a second BWP, and receiving a second uplink transmission in accordance the activation configuration message.

Some examples of the method, apparatuses, and non-transitory computer-readable medium described herein may further include operations, features, means, or instructions for communicating with the UE using a first BWP, where the activation configuration message may be transmitted over the first BWP, switching from communicating with the UE using the first BWP to communicating with the UE using a second BWP, transmitting a second activation configuration message to activate or deactivate one or more second panels of the set of multiple panels, where the second activation configuration message may be received over the second BWP, and receiving a second uplink transmission in accordance with the second activation configuration message.

Some examples of the method, apparatuses, and non-transitory computer-readable medium described herein may further include operations, features, means, or instructions for switching from communicating with the UE using the second BWP to communicating with the UE using the first BWP and receiving a third uplink transmission from the UE in accordance with the activation configuration message.

Some examples of the method, apparatuses, and non-transitory computer-readable medium described herein may further include operations, features, means, or instructions for transmitting a control message indicating a set of CCs of a group of serving cells configured for the UE, where the activation configuration message includes a message to activate or deactivate the one or more panels when communicating with the base station using a CC of the set of CCs and communicating with the UE using the CC of the set of CCs in accordance with the activation configuration message.

In some examples of the method, apparatuses, and non-transitory computer-readable medium described herein, the activation configuration message includes an RRC message, a MAC-CE, or a DCI message.

BRIEF DESCRIPTION OF THE DRAWINGS

FIGS. 1 and 2 illustrate examples of wireless communications systems that support techniques for network-initiated panel activation or deactivation at a user equipment (UE) in accordance with aspects of the present disclosure.

FIG. 3 illustrates an example of a bandwidth part (BWP) switching scheme that supports techniques for network-initiated panel activation or deactivation at a UE in accordance with aspects of the present disclosure.

FIG. 4 illustrates an example of a carrier aggregation (CA) scheme that supports techniques for network-initiated panel activation or deactivation at a UE in accordance with aspects of the present disclosure.

FIGS. 6 and 7 show block diagrams of devices that support techniques for network-initiated panel activation or deactivation at a UE in accordance with aspects of the present disclosure.

FIGS. 14 through 19 show flowcharts illustrating methods that support techniques for network-initiated panel activation or deactivation at a UE in accordance with aspects of the present disclosure.

DETAILED DESCRIPTION

Figure 1:
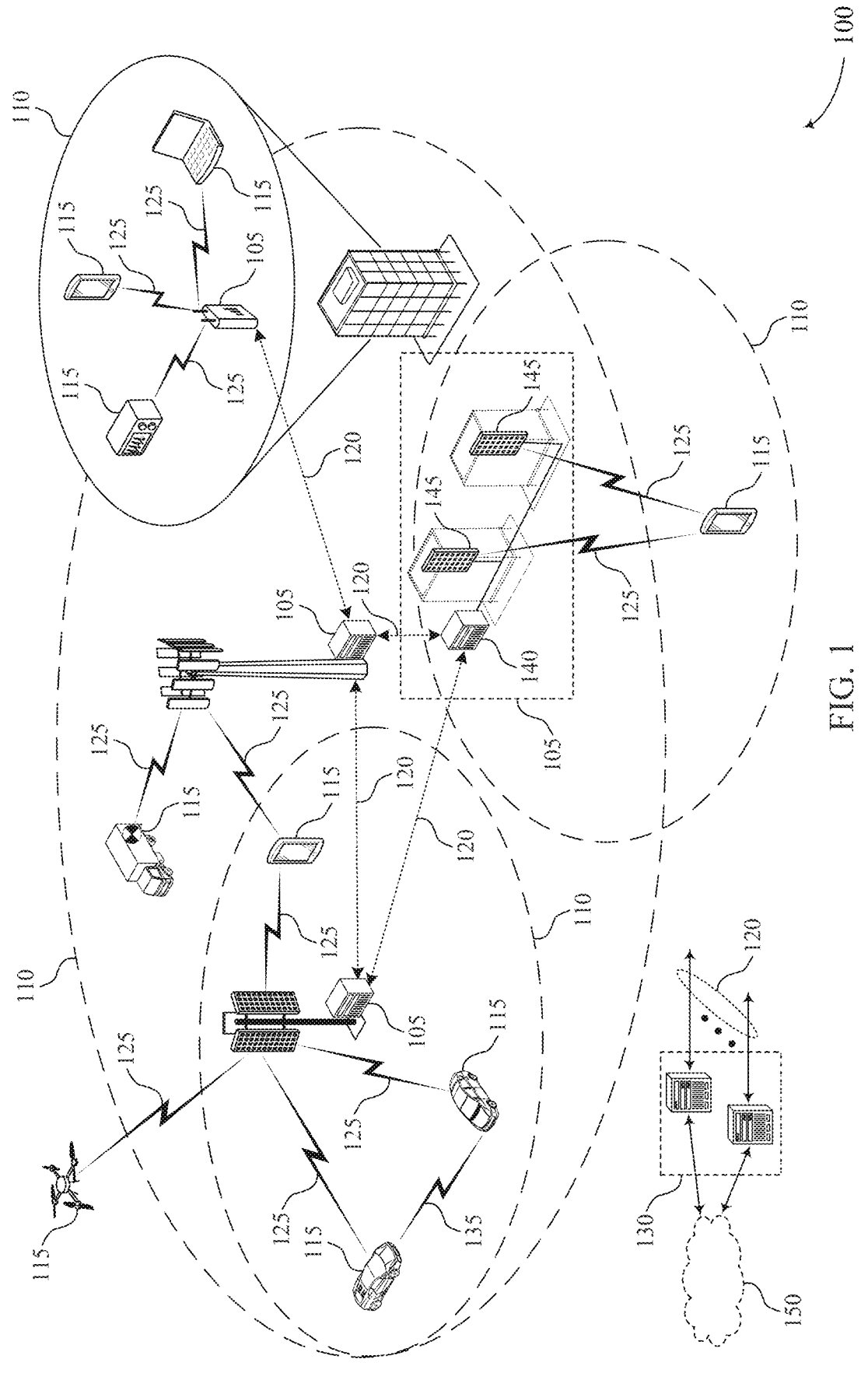

In some examples, a user equipment (UE) may include a set of panels and may utilize the set of the panels to transmit signaling to or receive signaling from a base station. The UE may activate a subset of the panels and select one or more of the activated panels to use for one or more uplink transmissions. The decision on which panels of the subset to activate may be made solely by that UE. For example, the UE may determine which subset of panels to activate by taking into account maximum permissible exposure (MPE) mitigation, UE power savings, UE interference management, different configurations across panels, or other factors. However, in some examples, it may be beneficial for the base station to facilitate panel activation or deactivation at the UE. For example, the base station may have access to UE capability information or interference information and as such may make a more suitable decision as to which antenna panels the UE is to activate or deactivate for communications as compared to a UE making such a decision on its own.

In some examples, a base station may transmit an activation configuration message indicating a subset of panels for activation or deactivation. In response to the message, the UE may activate or deactivate the indicated subset of panels and select a panel for one or more uplink transmissions based on the activation configuration message. In some examples, the activation configuration message may be an example of a control message which includes at least one codepoint mapped to one or more panels of the set of panels at the UE. In another example, the activation configuration message may be example of a control message including a bit field, where each bit field corresponds to one panel of a subset of panels at the UE or a single bit field corresponding to all the panels of the subset of panels at the UE. In another example, the activation configuration message may be an example of a control message including one or more entries for panel ID, where each panel ID corresponds to a panel of a subset of panels at the UE.

In some example, a UE utilizing a set of panels for communication with a base station may undergo a bandwidth part (BWP) switch. In such example, the UE may utilize an activation configuration message received while communicating on a first BWP and apply it to uplink transmissions while operating on a second BWP. Alternatively, the UE may receive a new activation configuration message for uplink transmissions while operating on the second BWP.

In some examples, the base station may configure a multi-panel UE with a group of serving cells which share the same activation configuration message. That is, the UE may apply a single activation configuration message when communicating over one serving cell of the configured group.

Aspects of the disclosure are initially described in the context of wireless communications systems. Additional aspects are described in the context of a BWP switching scheme, a CA scheme, and a process flow. Aspects of the disclosure are further illustrated by and described with reference to apparatus diagrams, system diagrams, and flowcharts that relate to techniques for network-initiated panel activation or deactivation at a UE.

FIG. 1 illustrates an example of a wireless communications system 100 that supports techniques for network-initiated panel activation or deactivation at a UE in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation (CA) or multi-carrier operation. A UE 115 may be configured with multiple downlink component carriers (CCs) and one or more uplink CCs according to a CA configuration. CA may be used with both frequency division duplexing (FDD) and time division duplexing (TDD) CCs.

In some examples (e.g., in a CA configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or more multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple CCs.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a CA configuration in conjunction with CCs operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some example, the base station 105 may facilitate activation or deactivation of panels at the UE 115. For example, the base station 105 may transmit an activation configuration message to the UE 115 indicating one or more panels for which the UE 115 may activate or deactivate. In response to the activation configuration, the UE 115 may activate or deactivate the indicated panels and select a panel for one or more uplink transmission to the base station 105 based on the control message.

FIG. 2 illustrates an example of a wireless communication system 200 that supports techniques for network-initiated panel activation or deactivation at a UE in accordance with aspects of the present disclosure. In some examples, the wireless communications system 200 may implement aspects of a wireless communications system 100. For example, the wireless communications system 200 may include base station 105-a and a UE 115-a which may be examples of a base station 105 and a UE 115 with reference to FIG. 1.

In some examples, a UE 115-a may utilize a set of panels (e.g., antenna panels, antenna groups, or antenna arrays) for wireless communications. For example, the UE 115-a may utilize some combination of a panel 205-a, a panel 205-b, and a panel 205-c to receive signals from or transmit signals to a base station 105-a. In some cases, the UE 115-a may transmit uplink signals to the base station 105-a using only a subset of the panels 205. That is, the UE 115-a may activate some panels 205 and deactivate the remaining panels 205 during one or more uplink transmissions to the base station 105-a. For example, the UE 115-a may activate the panel 205-a and the panel 205-b for one or more uplink transmissions and deactivate panel 205-c for the one or more uplink transmissions. That is, the UE 115-a may select from the activated panels (e.g., panel 205-a and panel 205-b) and transmit signals to the base station 105-a using the selected panel.

In some examples, the UE 115-a may activate or deactivate panels autonomously or without input from the network. In such cases, the UE 115-a may select panels for activation or deactivation with a goal of mitigating MPE, conserving power, avoiding interference, supporting different configurations across panels, and supporting uplink multi-TRP. However, in some cases, the network may have additional information about which panels 205 at the UE 115-a may offer decreased power consumption, reduced UE complexity, among other benefits.

According to some aspects, the base station 105-a may transmit an activation configuration message 210 to the UE 115-a. The activation configuration message 210 may include instructions for the UE 115-a to activate or deactivate one or more panels. For example, the activation configuration message 210 may be an example of a control message (e.g., a downlink control information (DCI) message) that includes one or more codepoints mapped to one or more panels 205 (e.g., panel identifiers (IDs)) that the UE 115-a is to activate or deactivate. For example, the UE 115-a may receive the activation configuration message 210 including a codepoint mapped to panel 205-a and panel 205-c. In response to the activation configuration message 210, the UE 115-a may activate or deactivate panel 205-a and panel 205-c for uplink transmissions 215. That is, in the case of activation, the UE 115-a may utilize one or both of panel 205-a and panel 205-c to transmit an uplink transmission 215 to the base station 105-*a*. In some examples, the UE 115-*a* may receive a message, prior to receiving the activation configuration message 210, that indicates the mapping between the one or more codepoints and the one or more panels 205. For example, the UE 115-*a* may receive an RRC message indicating a mapping between a first codepoint and panel 205-*a* and panel 205-*c* and a mapping between a second codepoint and panel 205-*b*. The UE 115-*a* may use the information obtained from the RRC message to interpret the activation configuration message 210.

In another example, the activation configuration message 210 may be an example of a control message (e.g., medium access control (MAC) control element (MAC-CE)) that includes one or more entries for panel ID which may correspond to panels 205 that the UE 115-*a* may activate or deactivate. For example, the activation configuration message 210 may include Panel0 which may correspond to panel 205-*a* and Panel1 which may correspond to panel 205-*b*. In response to the activation configuration message 210, the UE 115-*a* may activate or deactivate panel 205-*a* and panel 205-*b* for uplink transmissions 215. That is, in the case of activation, the UE 115-*a* may utilize one or both of panel 205-*a* and panel 205-*b* for an uplink transmission 215.

In another example, the activation configuration message 210 may be an example of a control message (e.g., DCI message or MAC-CE) that includes one or more bit fields, where each bit field may include one of an activation bit (e.g., bit value of 1) or a deactivation bit (e.g., bit value of 0). In some examples, each bit field may correspond to a single panel 205 that the UE 115-*a* may activate or deactivate. For example, the UE 115-*a* may receive the activation configuration message 210 including three bits fields corresponding to panel 205-*a*, panel 205-*b*, and panel 205-*c*, where each bit field includes one of an activation bit or a deactivation bit. Alternatively, the activation configuration message 210 may include a single bit field that corresponds to a set of panels 205. For example, the activation configuration message 210 may include a single bit field corresponding to panel 205-*a*, panel 205-*b*, and panel 205-*c*. If the bit field contains an activation bit, the UE 115-*a* may activate the corresponding panel 205 and potentially, use the panel 205 for uplink transmissions 215 to the base station 105-*a*. Alternatively, if the bit field contains a deactivation bit, the UE 115-*a* may deactivate the corresponding panel 205 and may not use the panel 205 for uplink transmissions 215 to the base station 105-*a*.

In some examples, the base station 105-*a* may implicitly indicate deactivation of one or more panel 205. That is, the base station 105-*a* may transmit a second activation configuration message 210 to implicitly indicate deactivation of the panels activated in a first activation configuration message 210. For example, the base station 105-*a* may transmit a first activation configuration message 210 instructing the UE 115-*a* to activate panel 205-*a* and panel 205-*b*. After some time, the base station 105-*a* may intend to deactivate panel 205-*a* and panel 205-*b* and activate panel 205-*c*. In such example, the base station 105-*a* may transmit a second activation configuration message 210 instructing the UE 115-*a* to activate panel 205-*c*. In response to receiving an activation configuration message 210 instructing activation of a panel 205 different from panel 205-*a* and panel 205-*b* (e.g., panel 205-*c*), the UE 115-*a* may deactivate panel 205-*a* and panel 205-*b*.

In some examples, the UE 115-*a* may undergo a BWP switch. For example, UE 115-*a* may receive a first activation configuration message 210 instructing the UE 115-*a* to activate or deactivate one or more panels 205 while communicating with the base station 105-*a* using a first BWP. After some time, the UE 115-*a* may undergo a BWP switch. That is, the UE 115-*a* may switch from communicating with the base station 105-*a* using a first BWP to communicating with a base station 105-*a* using a second BWP. In some examples, the UE 115-*a* may apply the same activation configuration message 210 (e.g., the first activation configuration message) while communicating with the base station 105 using the second BWP. In another example, the UE 115-*a* may receive a second activation configuration message 210 and activate or deactivate one or more panels 205 based on the second activation configuration message 210. In some examples, the UE 115-*a* may switch back to the original BWP. That is, the UE 115-*a* may switch from communicating with the base station 105-*a* using the second BWP back to communicating with the base station 105-*a* using the first BWP. In such example, the UE 115-*a* may suspend the first activation configuration message 210 or receive a third activation configuration message 210. That is, the UE 115-*a* may apply the instruction to activate or deactivate the panels 205 from the first activation configuration message 210 or receive new instructions via the third activation configuration message 210.

In some examples, the UE 115-*a* may receive an activation configuration message 210 instructing the UE 115-*a* to activate or deactivate one or more panels 205 when operating on a CC of a subset of CCs. For example, the base station 105-*a* may configure the UE 115-*a* with a set of CCs (e.g., CC1, CC2, and CC3) associated with a group of serving cells. Prior to receiving the activation configuration message 210, the base station 105-*a* may transmit a control message (e.g., RRC message) indicating a subset of CCs. For example, the control message may indicate CC1 and CC2. If the UE 115-*a* operates on CC1 or CC2, the UE 115-*a* may deactivate or activate panels 205 according to the activation configuration message. Such example may allow for network-initiated panel activation or deactivation at a UE 115-*a*.

FIG. 3 illustrates an example of a BWP switching scheme 300 that supports techniques for network-initiated panel activation or deactivation at a UE in accordance with aspects of the present disclosure. In some examples, the BWP switching scheme 300 may implement aspects of a wireless communications system 100 and a wireless communications system 200. For example, the BWP switching scheme 300 may include a base station 105-*b* and a UE 115-*b* which may be examples of a base station 105 and a UE 115 with reference to FIGS. 1 and 2.

The techniques described herein may apply to a UE 115-*b* undergoing a BWP switch. For example, the UE 115-*b* may communicate with a base station 105-*b* using BWP 305-*a*. While operating on BWP 305-*a*, the UE 115-*b* may receive an activation configuration message 315-*a* from the base station 105-*b*. The activation configuration message 315-*a* may be an example of any of the activation configuration messages as described with reference to FIG. 2 and may instruct the UE 115-*b* to activate or deactivate one or more panels for uplink transmissions. For example, the UE 115-*b* may include at least a first panel and a second panel and the activation configuration message 315-*a* may instruct the UE 115-*b* to activate the first panel. As such, the UE 115-*b* may transmit an uplink transmission 320-*a* using the first panel or any other panel activated at the UE 115-*b* (e.g., the second panel if activated).

In some examples, the UE 115-*b* may undergo a BWP switch. For example, the UE 115-*b* may switch from communicating with the base station 105-*b* using BWP 305-*a* to communicating with base station 105-*b* using BWP 305-*b*. In one example, the UE 115-*b* may utilize the information obtained from the activation configuration message 315 received previously over the BWP 305-*a* for panel activation or deactivation while communicating with the base station 105-*b* over the BWP 305-*b*. That is, the UE 115-*b* may continue to keep the first panel active and utilize the first panel or any other panel active at the UE 115-*b* for an uplink transmission 320-*b* over the BWP 305-*b*. Alternatively, the UE 115-*b* may receive a new activation configuration message 315-*b* for panel activation or deactivation while communicating with the base station 105-*b* over the BWP 305-*b*. For example, during BWP transition period 310-*a* (time it may take for the UE 115-*b* to switch from BWP 305-*a* to BWP 305-*b*), the UE 115-*b* may receive the activation configuration message 315-*b* instructing the UE 115-*b* to activate or deactivate one or more panels for uplink transmissions. For example, the UE 115-*b* may receive the activation configuration message 315-*b* instructing the UE 115-*b* to deactivate the first panel. That is, the UE 115-*b* may not use the first panel for an uplink transmission 320-*b* and may instead use an active panel at the UE 115-*b* (e.g., the second panel if activated).

Further, the UE 115-*b* may undergo a second BWP switch. For example, the UE 115-*b* may switch from communicating over the BWP 305-*b* back to communicating over the BWP 305-*a*. In one example, the UE 115-*b* may suspend the activation configuration message 315-*a* received over the BWP 305-*a* during the previous time period (e.g., before switching to BWP 305-*b*). That is, the UE 115-*b* may apply the information obtained from activation configuration message 315-*a* for panel activation or deactivation. For example, the UE 115-*b* may activate the first panel and select the first panel or any other panel active at the UE 115-*b* for an uplink transmission 320-*c*. Alternatively, the UE 115-*b* may receive a new activation configuration message 315-*c*. For example, during BWP transition period 310-*b* (time it takes for UE 115-*b* to switch from the BWP 305-*b* to the BWP 305-*a*), the UE 115-*b* may receive the activation configuration message 315-*c* instructing the UE to deactivate the first panel. That is, the UE may not use the first panel for an uplink transmission 320-*c* and instead use an active panel at the UE 115-*b*. (e.g., the second panel if activated). In such examples, the network may initiate panel activation or deactivation at a UE 115-*b* in BWP operations.

FIG. 4 illustrates an example of a CA scheme 400 that supports techniques for network-initiated panel activation or deactivation at a UE in accordance with aspects of the present disclosure. In some examples, the CA scheme 400 may implement aspects of a wireless communications system 100, a wireless communications system 200, and a BWP switching scheme 300. For example, the CA scheme 400 may include a base station 105-*c* and a UE 115-*c* which may be examples of a base station 105 and a UE 115 with reference to FIGS. 1 through 3.

In some example, the base station 105-*c* may configure the UE 115-*c* with a set of serving cells. For example, a primary serving cell which may corresponds to CC 410-*b*, a secondary serving cell which may correspond to CC 410-*c*, and a secondary serving cell which may correspond to CC 410-*a*. CC 410-*b* and CC 410-*c* may be located within band 415-*a* and CC 410-*a* may be located within band 415-*b*. Although inter-band CA is shown, the following techniques may also apply to intra-band CA.

In some examples, the UE 115-*c* may apply the same activation configuration message 425 for a set of CCs 410. For example, the UE 115-*c* may receive an activation configuration message 425 from base station 105-*c* instructing the UE 115-*c* to activate or deactivate one or more panels for uplink transmissions associated with a group of CCs. The activation configuration message 425 may be an example of any of the activation configuration messages as described with reference to FIGS. 2 and 3. In some examples, the UE 115-*c* may include at least a first panel and a second panel. In such case, the UE 115-*c* may receive the activation configuration message 425 instructing the UE 115-*c* to activate the first panel. In response to the activation configuration message 425, the UE 115-*c* may activate the first panel for uplink transmissions over any one of a CC 410 of a group of CCs 410 (e.g., CC 410-*a*, CC 410-*b*, and CC 410-*c*), even if the activation configuration message 425 is received over one CC (e.g., primary CC 410-*b*). That is, the UE 115-*c* may select the first panel or any other panel active at the UE 115-*c* for uplink transmissions over any one of the CC 410-*a*, the CC 410-*b*, or the CC 410-*c*.

In some examples, prior to receiving the activation configuration message 425, the UE 115-*c* may receive a control message 420 configuring the UE with the group of CCs 410 associated with the activation configuration message 425. That is, the UE may receive a control message 420 indicating CC 410-*a*, CC 410-*b*, and CC 410-*c*. In some examples, the control message 420 may be an example of an RRC message. Using the described techniques, the network may initiate panel activation or deactivation during CA operations.

Figure 5:
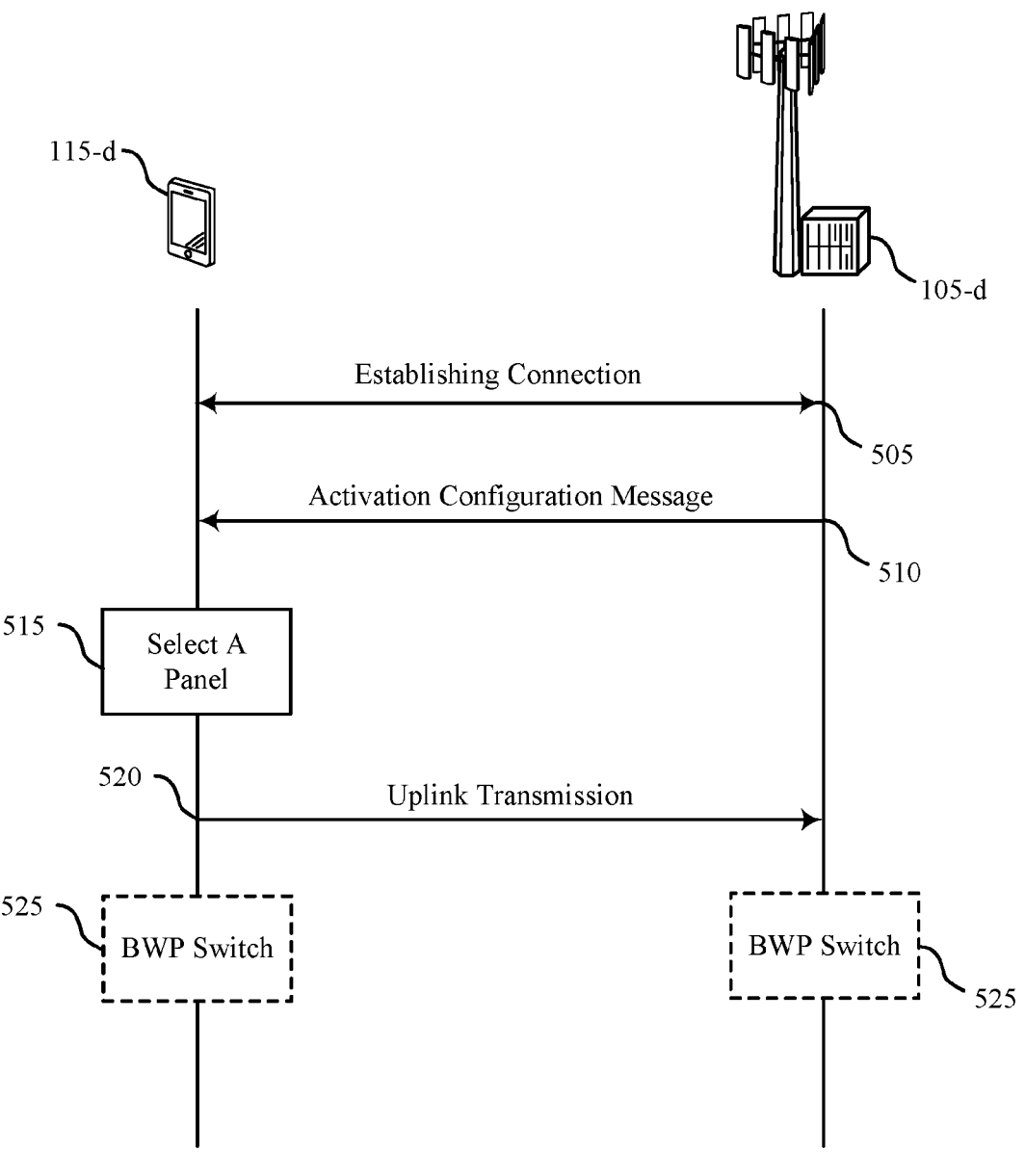
FIG. 5 illustrates an example of a process flow that supports techniques for network-initiated panel activation or deactivation at a UE in accordance with aspects of the present disclosure.

FIG. 5 illustrates an example of a process flow 500 that supports techniques for network-initiated panel activation or deactivation at a UE in accordance with aspects of the present disclosure. In some examples, process flow 500 may implement or may be implanted by aspects of a wireless communications system 100, a wireless communications system 200, a BWP switching scheme 300, and a CA scheme 400. For example, the process flow may include a base station 105-*d* and a UE 115-*d* which may be examples of a base station 105 and a UE 115 with respect to FIGS. 1-4. The process flow 500 may involve network-initiated panel activation or deactivation at a UE 115-*d*. Alternative examples of the following may be implemented, where some steps are performed in a different order then described or are not performed at all. In some cases, steps mat include additional features not mentioned below, or further steps may be added.

At 505, the UE 115-*d* may establish a communication link with the base station 105-*d*. In some examples, at 505, the UE 115-*d* may receive an RRC message indicating a group of CCs for which to apply an activation configuration message.

At 510, the UE 115-*d* may receive an activation configuration message from the base station 105-*d*. The activation configuration message may instruct the UE 115-*d* to activate or deactivate a subset of panels for one or more uplink transmission to the base station 105-*d*. For example, the UE 115-*d* may include a first panel and a second panel and the activation configuration message may instruct the UE to deactivate or activate the first panel. In some examples, the activation configuration message may be an example of a DCI message which includes one or more codepoints, where each codepoint is mapped to one or more panel IDs corresponding to panels that the UE 115-*d* may activate or deactivate. In such example, the mapping between the codepoints and the one or more panels may be indicated via an RRC message which may be received at 505. In another example, the activation configuration message may be an example of a MAC-CE which includes one or more entries for panel ID corresponding to the panels the UE 115-*d* may activate or deactivate. In another example, the activation configuration message may include a DCI message or MAC CE including one or more bit fields consisting of one of an activation bit or a deactivation bit, where each bit field corresponds to a panel the UE 115-d may activate or deactivate.

In some examples, the UE 115-d may apply the activation configuration message to the group of CC indicated at 505. That is, the UE 115-d may activate or deactivate the one or more panels indicated in the activation configuration message when transmitting an uplink transmission over any one of the CCs of the group of CCs.

At 515, the UE 115-d may select a panel for an uplink transmission to the base station 105-d. In some examples, the UE 115-d may include a set of panels such as a first panel and a second panel. If the UE 115-d receives an activation configuration message indicating activation of the first panel at 510, the UE 115-d may select the first panel for an uplink transmission. If the UE 115-d receives a configuration message deactivating the first panel at 510, the UE 115-d may not select the first panel for the uplink transmission.

At 520, the UE 115-d may send an uplink transmission to the base station 105-d. In some example, the UE 115-d may utilize the panel selected at 515 to transmit the uplink transmission to the base station 105-d.

At 525, the UE 115-d and the base station 105-d may perform a BWP switch. That is, the UE 115-d may switch from communicating with the base station 105-d using a first BWP to communicating with the base station 105-d using a second BWP. In some examples, the UE 115-d may utilize the activation configuration message received at 510 after performing the BWP switch. That is the UE 115-d may activate or deactivate the one or more panels indicated in the activation configuration message received at 510. In another example, the UE 115-d may receive a second activation configuration message instructing the UE 115-d to activate or deactivate one or more second panels.

FIG. 6 shows a block diagram 600 of a device 605 that supports techniques for network-initiated panel activation or deactivation at a UE in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for network-initiated panel activation or deactivation at a UE). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for network-initiated panel activation or deactivation at a UE). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for network-initiated panel activation or deactivation at a UE as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for establishing a connection between a base station and the UE, the UE having a set of multiple panels for wireless communications. The communications manager 620 may be configured as or otherwise support a means for receiving, from the base station, an activation configuration message to activate or deactivate one or more panels of the set of multiple panels. The communications manager 620 may be configured as or otherwise support a means for selecting a subset of the set of multiple panels for an uplink transmission based on the activation configuration message. The communications manager 620 may be configured as or otherwise support a means for transmitting, to the base station, the uplink transmission using the selected subset of the set of multiple panels.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced power consumption. For example, by receiving the activation configuration message from the base station, the device 605 may no longer determine which panels to activate or deactivate. As such, the device 605 may utilize less computational power.

Figure 7:
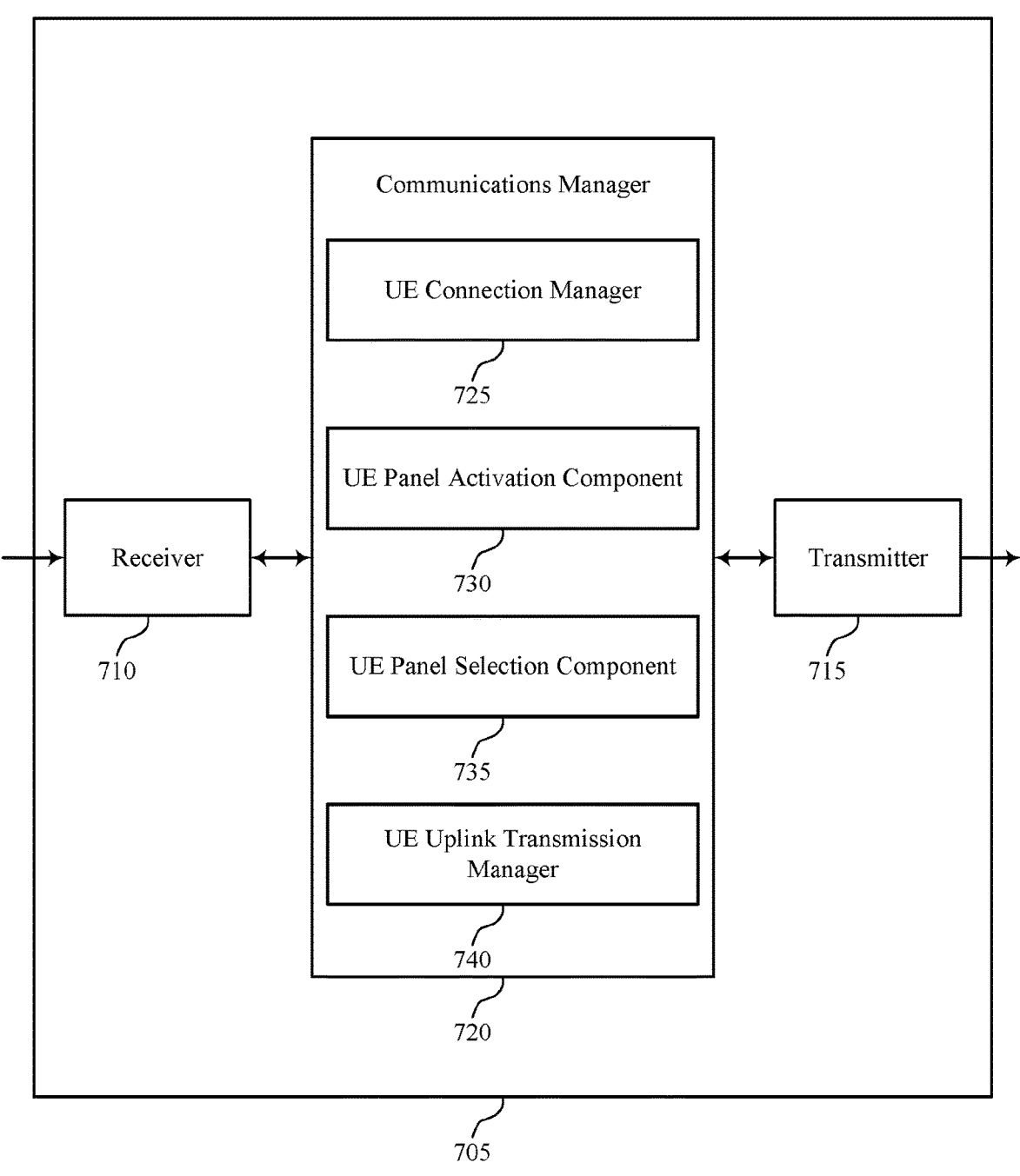

FIG. 7 shows a block diagram 700 of a device 705 that supports techniques for network-initiated panel activation or deactivation at a UE in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for network-initiated panel activation or deactivation at a UE). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for network-initiated panel activation or deactivation at a UE). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for network-initiated panel activation or deactivation at a UE as described herein. For example, the communications manager 720 may include a UE connection manager 725, a UE panel activation component 730, a UE panel selection component 735, a UE uplink transmission manager 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The UE connection manager 725 may be configured as or otherwise support a means for establishing a connection between a base station and the UE, the UE having a set of multiple panels for wireless communications. The UE panel activation component 730 may be configured as or otherwise support a means for receiving, from the base station, an activation configuration message to activate or deactivate one or more panels of the set of multiple panels. The UE panel selection component 735 may be configured as or otherwise support a means for selecting a subset of the set of multiple panels for an uplink transmission based on the activation configuration message. The UE uplink transmission manager 740 may be configured as or otherwise support a means for transmitting, to the base station, the uplink transmission using the selected subset of the set of multiple panels.

Figure 8:
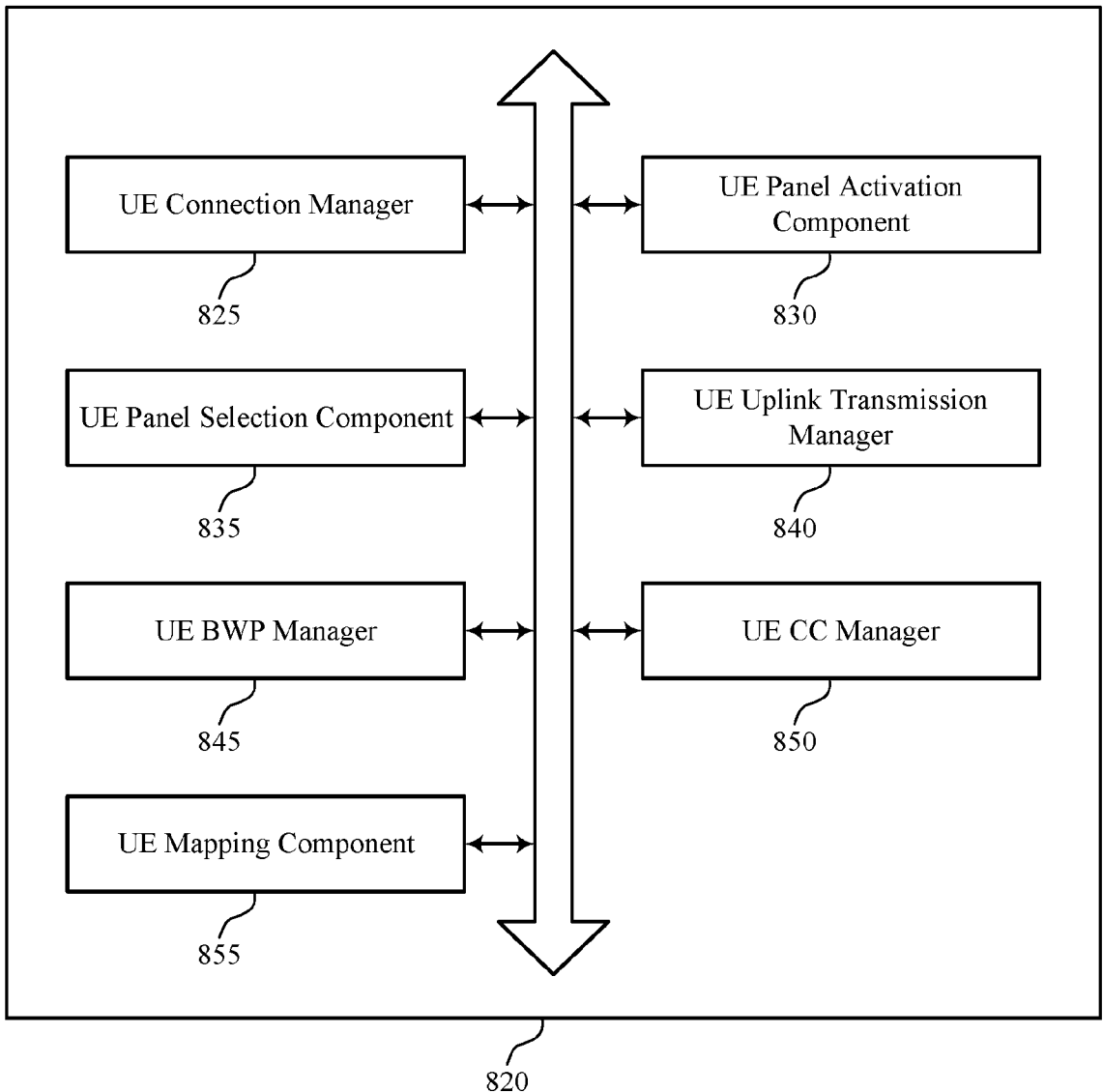
FIG. 8 shows a block diagram of a communications manager that supports techniques for network-initiated panel activation or deactivation at a UE in accordance with aspects of the present disclosure.

FIG. 8 shows a block diagram 800 of a communications manager 820 that supports techniques for network-initiated panel activation or deactivation at a UE in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for network-initiated panel activation or deactivation at a UE as described herein. For example, the communications manager 820 may include a UE connection manager 825, a UE panel activation component 830, a UE panel selection component 835, a UE uplink transmission manager 840, a UE BWP manager 845, a UE CC manager 850, a UE mapping component 855, or any combination thereof. Each of these components may communicate, directly or indirectly, with one another (e.g., via one or more buses).

The communications manager 820 may support wireless communication at a UE in accordance with examples as disclosed herein. The UE connection manager 825 may be configured as or otherwise support a means for establishing a connection between a base station and the UE, the UE having a set of multiple panels for wireless communications. The UE panel activation component 830 may be configured as or otherwise support a means for receiving, from the base station, an activation configuration message to activate or deactivate one or more panels of the set of multiple panels. The UE panel selection component 835 may be configured as or otherwise support a means for selecting a subset of the set of multiple panels for an uplink transmission based on the activation configuration message. The UE uplink transmission manager 840 may be configured as or otherwise support a means for transmitting, to the base station, the uplink transmission using the selected subset of the set of multiple panels.

In some examples, to support receiving the activation configuration message, the UE panel activation component 830 may be configured as or otherwise support a means for receiving a control message including a bit field for each of the one or more panels, where each bit field includes one of a bit for activating a respective panel of the one or more panels or a bit for deactivating a respective panel of the one or more panels.

In some examples, to support receiving the activation configuration message, the UE panel activation component 830 may be configured as or otherwise support a means for receiving a control message including a single bit field for the one or more panels, where the bit field includes one of a bit for activating the one or more panels or a bit for deactivating the one or more panels.

In some examples, to support receiving the activation configuration message, the UE panel activation component 830 may be configured as or otherwise support a means for receiving a first control message including a set of activation codepoints or a set of deactivation codepoints, where each codepoint of the set of activation codepoints or the set of deactivation codepoints is mapped to at least one panel of the one or more panels.

In some examples, the UE mapping component 855 may be configured as or otherwise support a means for receiving, before receiving the first control message, a second control message indicating the mapping between each codepoint of the set of activation codepoints or the set of deactivation codepoints and the at least one panel of the one or more panels.

In some examples, to support receiving the activation configuration message, the UE panel activation component 830 may be configured as or otherwise support a means for receiving a control message including a set of panel IDs, where each panel ID of the set of panel IDs corresponds to a panel of the one or more panels.

In some examples, the UE panel activation component 830 may be configured as or otherwise support a means for receiving a second activation configuration message to activate one or more second panels different from the one or more panels. In some examples, the UE panel activation component 830 may be configured as or otherwise support a means for deactivating the one or more panels based on the second activation configuration message.

In some examples, the UE BWP manager 845 may be configured as or otherwise support a means for communicating with the base station using a first BWP, where the activation configuration message is received over the first BWP. In some examples, the UE BWP manager 845 may be configured as or otherwise support a means for switching from communicating with the base station using the first BWP to the communicating with the base station using a second BWP. In some examples, the UE panel selection component 835 may be configured as or otherwise support a means for selecting a second subset of the set of multiple panels for a second uplink transmission using the second BWP based on the activation configuration message.

In some examples, the UE BWP manager 845 may be configured as or otherwise support a means for communicating with the base station using a first BWP, where the activation configuration message is received over the first BWP. In some examples, the UE BWP manager 845 may be configured as or otherwise support a means for switching from communicating with the base station using the first BWP to the communicating with the base station using a second BWP. In some examples, the UE panel activation component 830 may be configured as or otherwise support a means for receiving a second activation configuration message to activate or deactivate one or more second panels of the set of multiple panels, where the second activation configuration message is received over the second BWP. In some examples, the UE panel selection component 835 may be configured as or otherwise support a means for selecting a second subset of the set of multiple panels for a second uplink transmission using the second BWP based on the second activation configuration message.

In some examples, the UE BWP manager 845 may be configured as or otherwise support a means for switching from communicating with the base station using the second BWP to communicating with the base station using the first BWP. In some examples, the UE panel selection component 835 may be configured as or otherwise support a means for selecting a third subset of the set of multiple panels for a third uplink transmission using the first BWP based on the activation configuration message.

In some examples, the UE CC manager 850 may be configured as or otherwise support a means for receiving a control message indicating a set of CCs of a group of serving cells configured for the UE, where the activation configuration message includes a message to activate or deactivate the one or more panels when communicating using a CC of the set of CCs. In some examples, the UE panel selection component 835 may be configured as or otherwise support a means for communicating with the base station using the CC of the set of CCs and the selected subset of the set of multiple panels of the set of multiple panels based on the activation configuration message.

In some examples, the activation configuration message includes an RRC message, a MAC-CE, or a DCI message.

Figure 9:
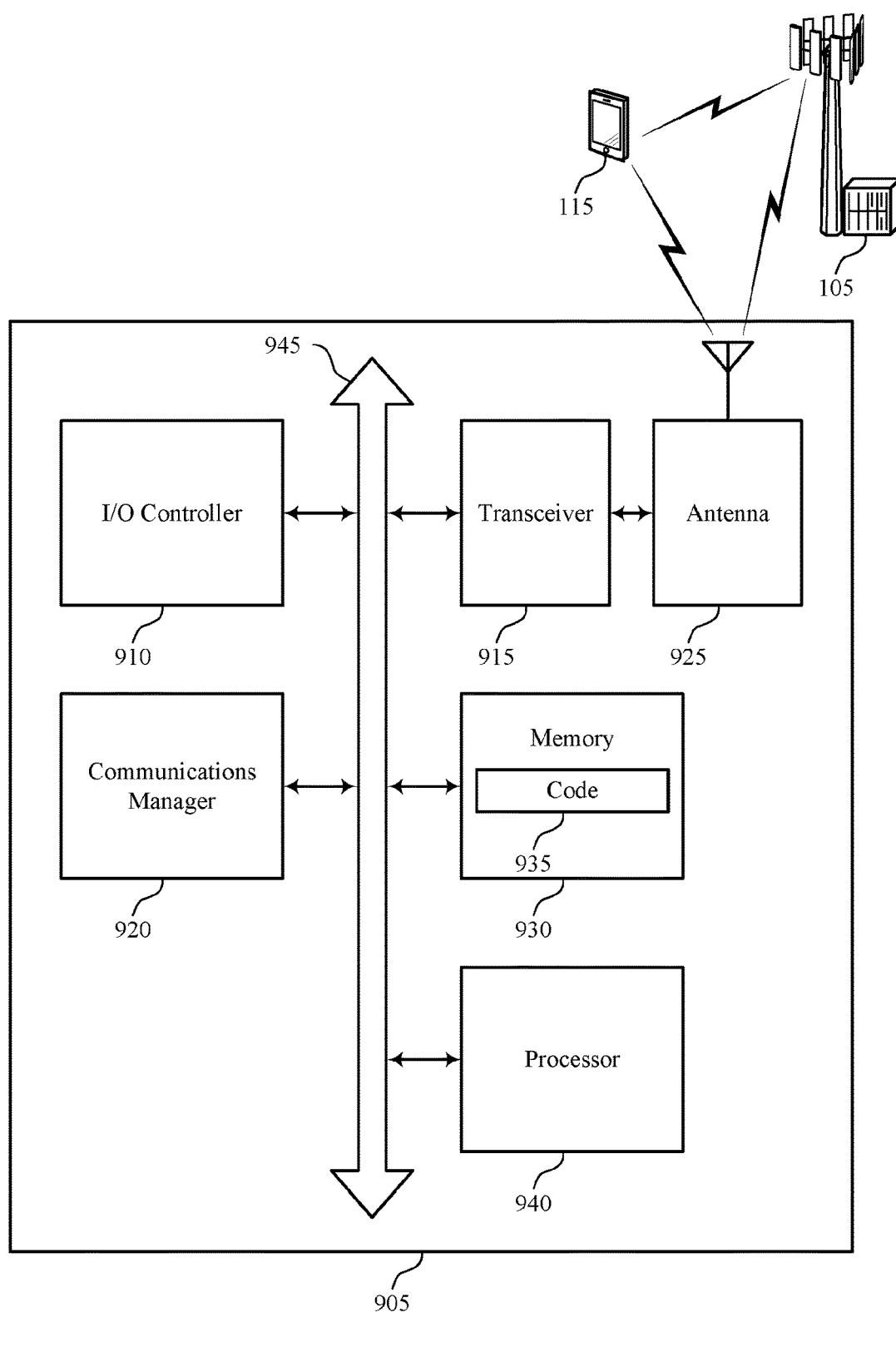
FIG. 9 shows a diagram of a system including a device that supports techniques for network-initiated panel activation or deactivation at a UE in accordance with aspects of the present disclosure.

FIG. 9 shows a diagram of a system 900 including a device 905 that supports techniques for network-initiated panel activation or deactivation at a UE in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for network-initiated panel activation or deactivation at a UE). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for establishing a connection between a base station and the UE, the UE having a set of multiple panels for wireless communications. The communications manager 920 may be configured as or otherwise support a means for receiving, from the base station, an activation configuration message to activate or deactivate one or more panels of the set of multiple panels. The communications manager 920 may be configured as or otherwise support a means for selecting a subset of the set of multiple panels for an uplink transmission based on the activation configuration message. The communications manager 920 may be configured as or otherwise support a means for transmitting, to the base station, the uplink transmission using the selected subset of the set of multiple panels.

By including or configuring the communications manager 920 in accordance with examples as described herein, the device 905 may support techniques for reduced power consumption and improved coordination.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for network-initiated panel activation or deactivation at a UE as described herein, or the processor 940 and the memory 930 may be otherwise configured to perform or support such operations.

Figure 10:
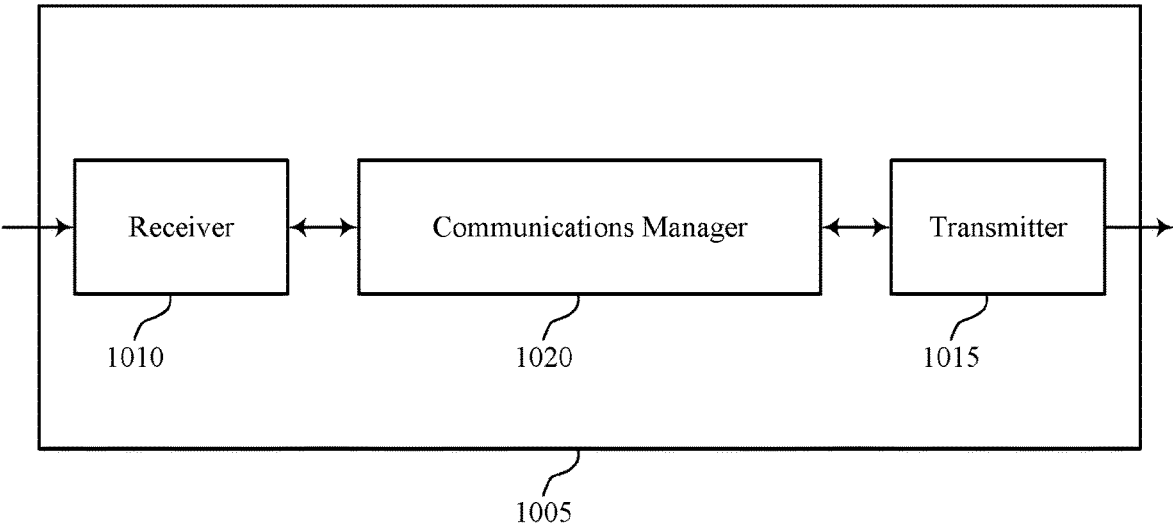
FIGS. 10 and 11 show block diagrams of devices that support techniques for network-initiated panel activation or deactivation at a UE in accordance with aspects of the present disclosure.

FIG. 10 shows a block diagram 1000 of a device 1005 that supports techniques for network-initiated panel activation or deactivation at a UE in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for network-initiated panel activation or deactivation at a UE). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for network-initiated panel activation or deactivation at a UE). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of techniques for network-initiated panel activation or deactivation at a UE as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

For example, the communications manager 1020 may be configured as or otherwise support a means for establishing a connection between the base station and a UE, the UE having a set of multiple panels for wireless communications. The communications manager 1020 may be configured as or otherwise support a means for transmitting, to the UE, an activation configuration message to activate or deactivate one or more panels of the set of multiple panels. The communications manager 1020 may be configured as or otherwise support a means for receiving, from the UE, an uplink transmission in accordance with the activation configuration message.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for reduced power consumption.

Figure 11:
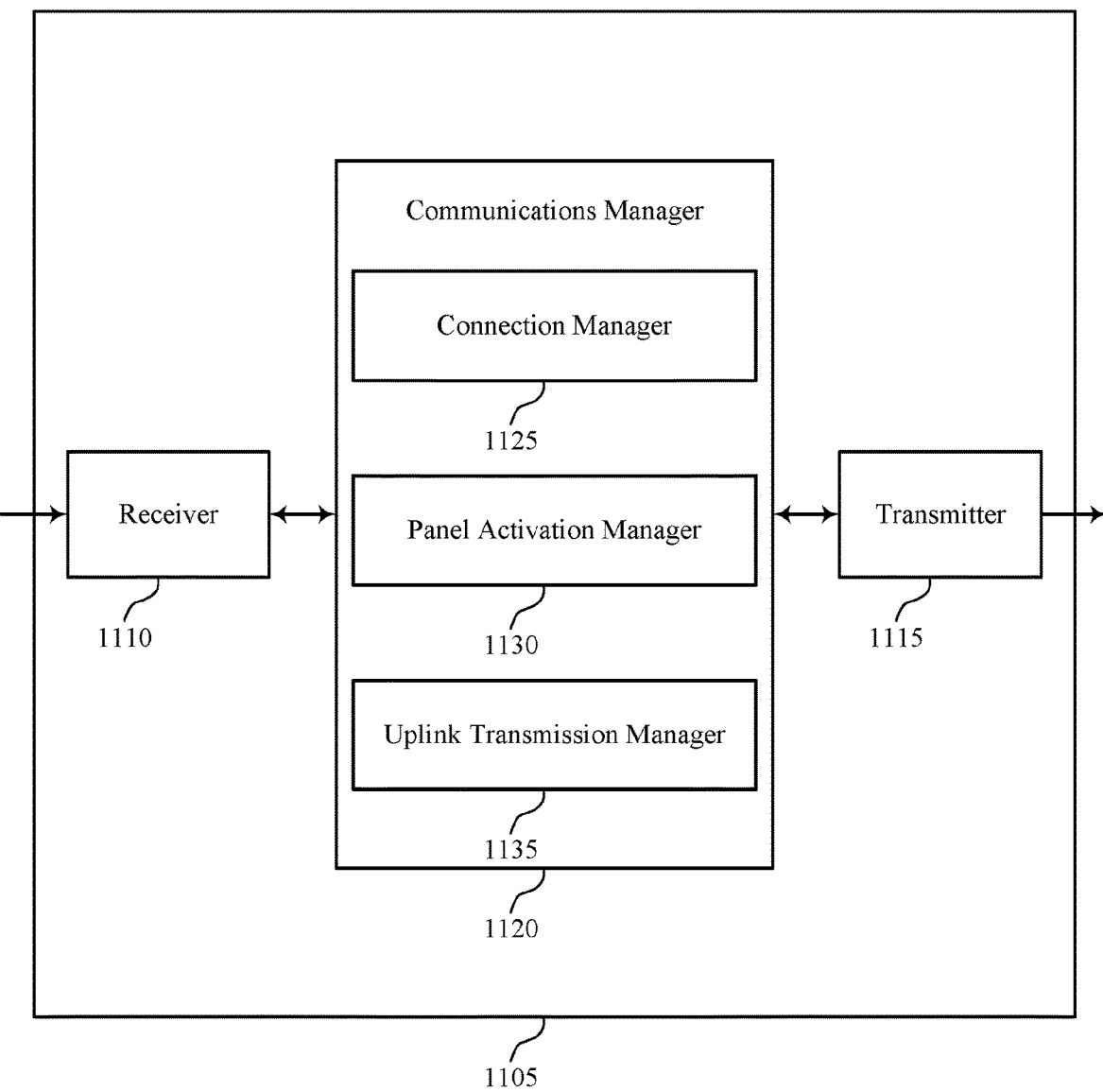

FIG. 11 shows a block diagram 1100 of a device 1105 that supports techniques for network-initiated panel activation or deactivation at a UE in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for network-initiated panel activation or deactivation at a UE). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for network-initiated panel activation or deactivation at a UE). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of techniques for network-initiated panel activation or deactivation at a UE as described herein. For example, the communications manager 1120 may include a connection manager 1125, a panel activation manager 1130, an uplink transmission manager 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The connection manager 1125 may be configured as or otherwise support a means for establishing a connection between the base station and a UE, the UE having a set of multiple panels for wireless communications. The panel activation manager 1130 may be configured as or otherwise support a means for transmitting, to the UE, an activation configuration message to activate or deactivate one or more panels of the set of multiple panels. The uplink transmission manager 1135 may be configured as or otherwise support a means for receiving, from the UE, an uplink transmission in accordance with the activation configuration message.

Figure 12:
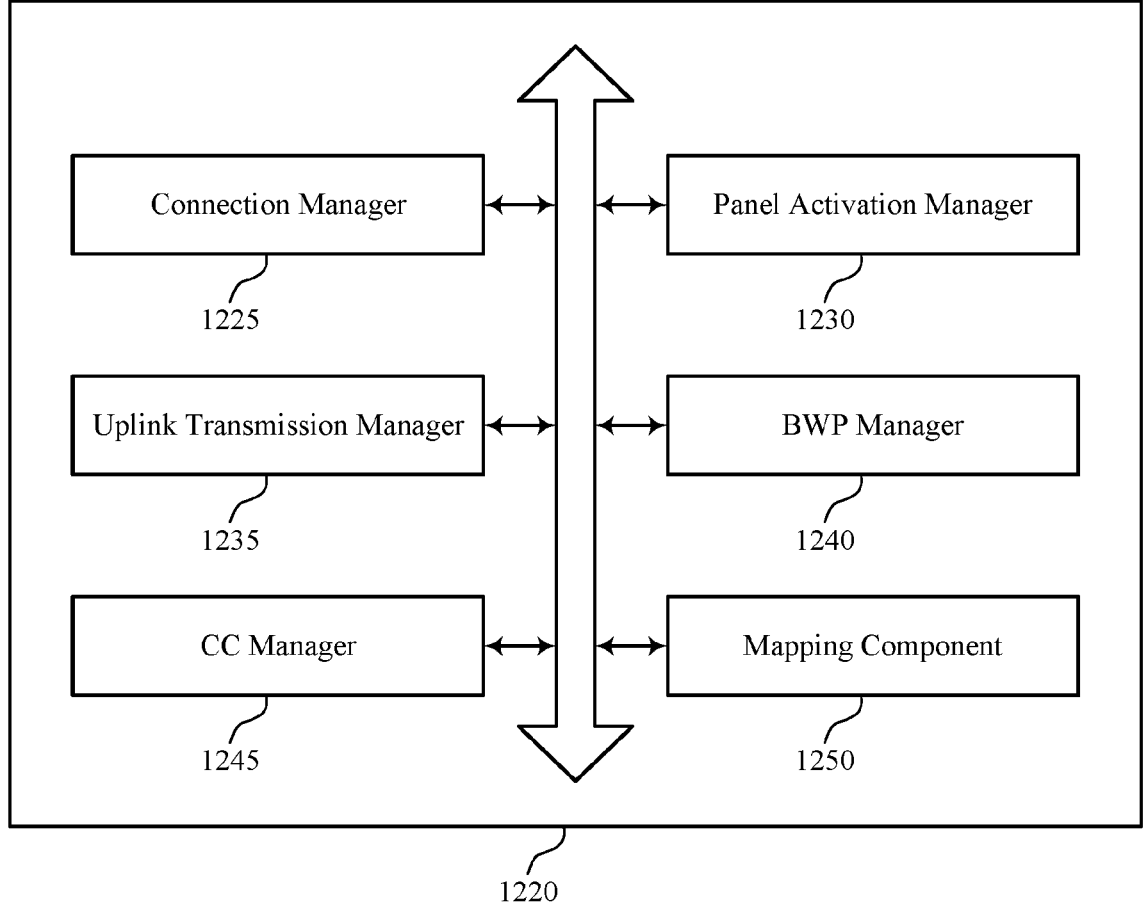
FIG. 12 shows a block diagram of a communications manager that supports techniques for network-initiated panel activation or deactivation at a UE in accordance with aspects of the present disclosure.

FIG. 12 shows a block diagram 1200 of a communications manager 1220 that supports techniques for network-initiated panel activation or deactivation at a UE in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of techniques for network-initiated panel activation or deactivation at a UE as described herein. For example, the communications manager 1220 may include a connection manager 1225, a panel activation manager 1230, an uplink transmission manager 1235, a BWP manager 1240, a CC manager 1245, a mapping component 1250, or any combination thereof. Each of these components may communicate, directly or indirectly, with one another (e.g., via one or more buses).

The connection manager 1225 may be configured as or otherwise support a means for establishing a connection between the base station and a UE, the UE having a set of multiple panels for wireless communications. The panel activation manager 1230 may be configured as or otherwise support a means for transmitting, to the UE, an activation configuration message to activate or deactivate one or more panels of the set of multiple panels. The uplink transmission manager 1235 may be configured as or otherwise support a means for receiving, from the UE, an uplink transmission in accordance with the activation configuration message.

In some examples, transmitting a control message including a bit field for each of the one or more panels, where each bit field includes one of a bit for activating a respective panel of the one or more panels or a bit for deactivating a respective panel of the one or more panels.

In some examples, to support transmitting the activation configuration message, the panel activation manager 1230 may be configured as or otherwise support a means for transmitting a control message including a single bit field for the one or more panels, where the single bit field including one of a bit for activating the one or more panels or a bit for deactivating the one or more panels.

In some examples, to support transmitting the activation configuration message, the panel activation manager 1230 may be configured as or otherwise support a means for transmitting a first control message including a set of activation codepoints or a set of deactivation codepoints, where each codepoint of the set of activation codepoints or the set of deactivation codepoints is mapped to at least one panel of the one or more panels.

In some examples, the mapping component 1250 may be configured as or otherwise support a means for transmitting, before transmitting the first control message, a second control message indicating the mapping between each codepoint of the set of activation codepoints or the set of deactivation codepoints and the at least one panel of the one or more panels.

In some examples, to support transmitting the activation configuration message, the panel activation manager 1230 may be configured as or otherwise support a means for transmitting a control message including a set of panel IDs, where each panel ID of the set of panel IDs corresponds to one panel of the one or more panels.

In some examples, the panel activation manager 1230 may be configured as or otherwise support a means for transmitting a second activation configuration message to activate one or more second panels different from the one or more panels. In some examples, the uplink transmission manager 1235 may be configured as or otherwise support a means for receiving a second uplink transmission from the UE in accordance with the second activation configuration message.

In some examples, the BWP manager 1240 may be configured as or otherwise support a means for communicating with the UE using a first BWP, where the activation configuration message is transmitted over the first BWP. In some examples, the BWP manager 1240 may be configured as or otherwise support a means for switching from communicating with the UE using the first BWP to communicating with the UE using a second BWP. In some examples, the uplink transmission manager 1235 may be configured as or otherwise support a means for receiving a second uplink transmission in accordance the activation configuration message.

In some examples, the BWP manager 1240 may be configured as or otherwise support a means for communicating with the UE using a first BWP, where the activation configuration message is transmitted over the first BWP. In some examples, the BWP manager 1240 may be configured as or otherwise support a means for switching from communicating with the UE using the first BWP to communicating with the UE using a second BWP. In some examples, the panel activation manager 1230 may be configured as or otherwise support a means for transmitting a second activation configuration message to activate or deactivate one or more second panels of the set of multiple panels, where the second activation configuration message is received over the second BWP. In some examples, the uplink transmission manager 1235 may be configured as or otherwise support a means for receiving a second uplink transmission in accordance with the second activation configuration message.

In some examples, the BWP manager 1240 may be configured as or otherwise support a means for switching from communicating with the UE using the second BWP to communicating with the UE using the first BWP. In some examples, the uplink transmission manager 1235 may be configured as or otherwise support a means for receiving a third uplink transmission from the UE in accordance with the activation configuration message.

In some examples, the CC manager 1245 may be configured as or otherwise support a means for transmitting a control message indicating a set of CCs of a group of serving cells configured for the UE, where the activation configuration message includes a message to activate or deactivate the one or more panels when communicating with the base station using a CC of the set of CCs. In some examples, the uplink transmission manager 1235 may be configured as or otherwise support a means for communicating with the UE using the CC of the set of CCs in accordance with the activation configuration message.

In some examples, the activation configuration message includes an RRC message, a MAC-CE, or a DCI message.

Figure 13:
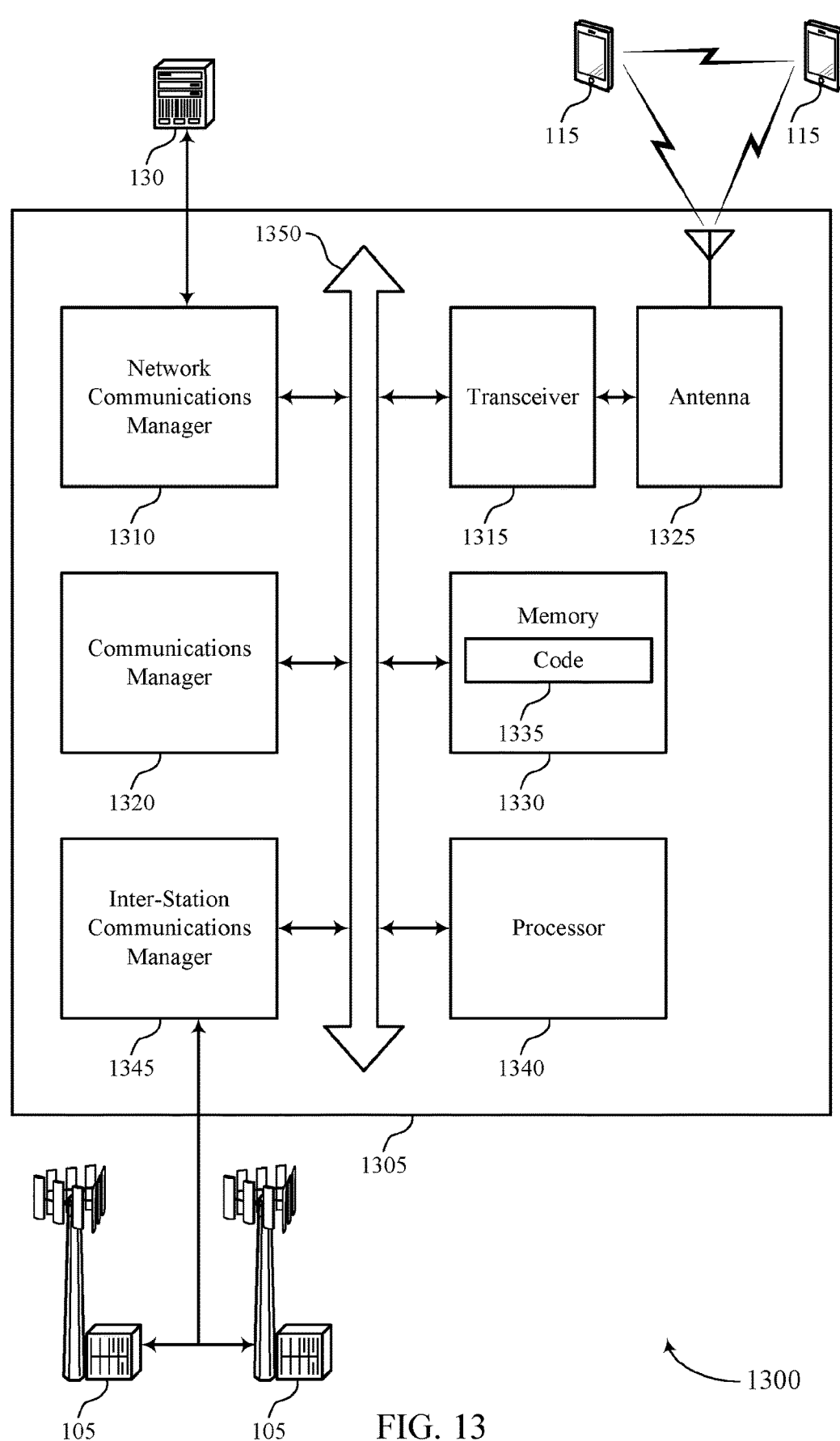
FIG. 13 shows a diagram of a system including a device that supports techniques for network-initiated panel activation or deactivation at a UE in accordance with aspects of the present disclosure.

FIG. 13 shows a diagram of a system 1300 including a device 1305 that supports techniques for network-initiated panel activation or deactivation at a UE in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for network-initiated panel activation or deactivation at a UE). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

For example, the communications manager 1320 may be configured as or otherwise support a means for establishing a connection between the base station and a UE, the UE having a set of multiple panels for wireless communications. The communications manager 1320 may be configured as or otherwise support a means for transmitting, to the UE, an activation configuration message to activate or deactivate one or more panels of the set of multiple panels. The communications manager 1320 may be configured as or otherwise support a means for receiving, from the UE, an uplink transmission in accordance with the activation configuration message.

By including or configuring the communications manager 1320 in accordance with examples as described herein, the device 1305 may support techniques for reduced power consumption and improved coordination between devices.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of techniques for network-initiated panel activation or deactivation at a UE as described herein, or the processor 1340 and the memory 1330 may be otherwise configured to perform or support such operations.

FIG. 14 shows a flowchart illustrating a method 1400 that supports techniques for network-initiated panel activation or deactivation at a UE in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include establishing a connection between a base station and the UE, the UE having a set of multiple panels for wireless communications. The operations of 1405 may be performed in accordance with examples as disclosed herein. In some examples, aspects of the operations of 1405 may be performed by a UE connection manager 825 as described with reference to FIG. 8.

At 1410, the method may include receiving, from the base station, an activation configuration message to activate or deactivate one or more panels of the set of multiple panels. The operations of 1410 may be performed in accordance with examples as disclosed herein. In some examples, aspects of the operations of 1410 may be performed by a UE panel activation component 830 as described with reference to FIG. 8.

At 1415, the method may include selecting a subset of the set of multiple panels for an uplink transmission based on the activation configuration message. The operations of 1415 may be performed in accordance with examples as disclosed herein. In some examples, aspects of the operations of 1415 may be performed by a UE panel selection component 835 as described with reference to FIG. 8.

At 1420, the method may include transmitting, to the base station, the uplink transmission using the selected subset of the set of multiple panels. The operations of 1420 may be performed in accordance with examples as disclosed herein. In some examples, aspects of the operations of 1420 may be performed by a UE uplink transmission manager 840 as described with reference to FIG. 8.

FIG. 15 shows a flowchart illustrating a method 1500 that supports techniques for network-initiated panel activation or deactivation at a UE in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include establishing a connection between a base station and the UE, the UE having a set of multiple panels for wireless communications. The operations of 1505 may be performed in accordance with examples as disclosed herein. In some examples, aspects of the operations of 1505 may be performed by a UE connection manager 825 as described with reference to FIG. 8.

At 1510, the method may include receiving, from the base station, an activation configuration message to activate or deactivate one or more panels of the set of multiple panels, where the activation configuration message includes a first control message including a set of activation codepoints or a set of deactivation codepoints, where each codepoint of the set of activation codepoints or the set of deactivation codepoints is mapped to at least one panel of the one or more panels. The operations of 1510 may be performed in accordance with examples as disclosed herein. In some examples, aspects of the operations of 1510 may be performed by a UE panel activation component 830 as described with reference to FIG. 8.

At 1515, the method may include selecting a subset of the set of multiple panels for an uplink transmission based on the activation configuration message. The operations of 1515 may be performed in accordance with examples as disclosed herein. In some examples, aspects of the operations of 1515 may be performed by a UE panel selection component 835 as described with reference to FIG. 8.

At 1520, the method may include transmitting, to the base station, the uplink transmission using the selected subset of the set of multiple panels. The operations of 1520 may be performed in accordance with examples as disclosed herein. In some examples, aspects of the operations of 1520 may be performed by a UE uplink transmission manager 840 as described with reference to FIG. 8.

FIG. 16 shows a flowchart illustrating a method 1600 that supports techniques for network-initiated panel activation or deactivation at a UE in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include establishing a connection between a base station and the UE, the UE having a set of multiple panels for wireless communications. The operations of 1605 may be performed in accordance with examples as disclosed herein. In some examples, aspects of the operations of 1605 may be performed by a UE connection manager 825 as described with reference to FIG. 8.

At 1610, the method may include receiving, from the base station, an activation configuration message to activate or deactivate one or more panels of the set of multiple panels, where the activation configuration message includes a control message including a set of panel IDs, where each panel ID of the set of panel IDs corresponds to a panel of the one or more panels. The operations of 1610 may be performed in accordance with examples as disclosed herein. In some examples, aspects of the operations of 1610 may be performed by a UE panel activation component 830 as described with reference to FIG. 8.

At 1615, the method may include selecting a subset of the set of multiple panels for an uplink transmission based on the activation configuration message. The operations of 1615 may be performed in accordance with examples as disclosed herein. In some examples, aspects of the operations of 1615 may be performed by a UE panel selection component 835 as described with reference to FIG. 8.

At 1620, the method may include transmitting, to the base station, the uplink transmission using the selected subset of the set of multiple panels. The operations of 1620 may be performed in accordance with examples as disclosed herein. In some examples, aspects of the operations of 1620 may be performed by a UE uplink transmission manager 840 as described with reference to FIG. 8.

FIG. 17 shows a flowchart illustrating a method 1700 that supports techniques for network-initiated panel activation or deactivation at a UE in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include establishing a connection between the base station and a UE, the UE having a set of multiple panels for wireless communications. The operations of 1705 may be performed in accordance with examples as disclosed herein. In some examples, aspects of the operations of 1705 may be performed by a connection manager 1225 as described with reference to FIG. 12.

At 1710, the method may include transmitting, to the UE, an activation configuration message to activate or deactivate one or more panels of the set of multiple panels. The operations of 1710 may be performed in accordance with examples as disclosed herein. In some examples, aspects of the operations of 1710 may be performed by a panel activation manager 1230 as described with reference to FIG. 12.

At 1715, the method may include receiving, from the UE, an uplink transmission in accordance with the activation configuration message. The operations of 1715 may be performed in accordance with examples as disclosed herein. In some examples, aspects of the operations of 1715 may be performed by an uplink transmission manager 1235 as described with reference to FIG. 12.

Figure 18:
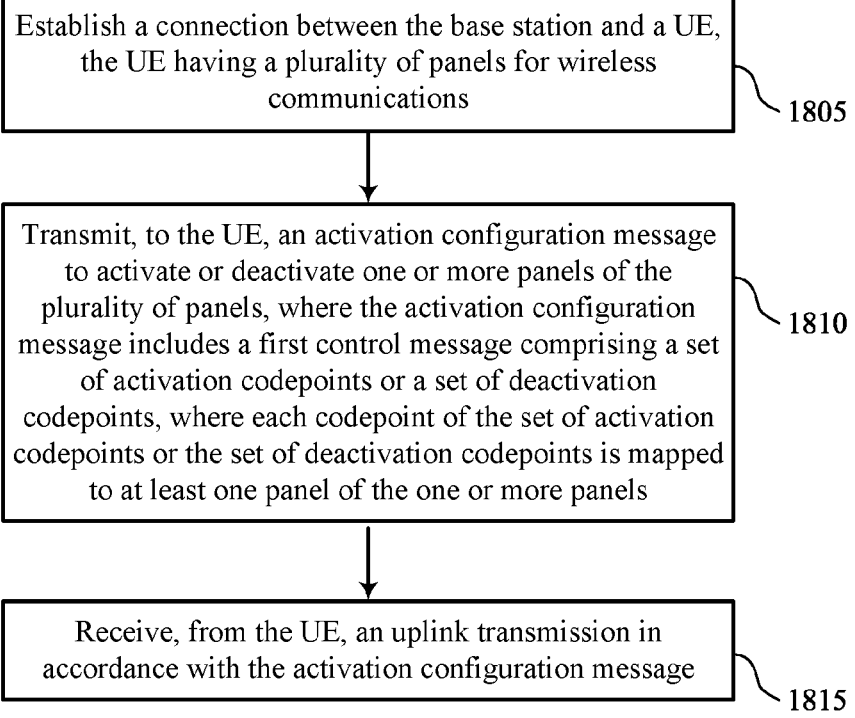

FIG. 18 shows a flowchart illustrating a method 1800 that supports techniques for network-initiated panel activation or deactivation at a UE in accordance with aspects of the present disclosure. The operations of the method 1800 may be implemented by a base station or its components as described herein. For example, the operations of the method 1800 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1805, the method may include establishing a connection between the base station and a UE, the UE having a set of multiple panels for wireless communications. The operations of 1805 may be performed in accordance with examples as disclosed herein. In some examples, aspects of the operations of 1805 may be performed by a connection manager 1225 as described with reference to FIG. 12.

At 1810, the method may include transmitting, to the UE, an activation configuration message to activate or deactivate one or more panels of the set of multiple panels, where the activation configuration message includes a first control message including a set of activation codepoints or a set of deactivation codepoints, where each codepoint of the set of activation codepoints or the set of deactivation codepoints is mapped to at least one panel of the one or more panels. The operations of 1810 may be performed in accordance with examples as disclosed herein. In some examples, aspects of the operations of 1810 may be performed by a panel activation manager 1230 as described with reference to FIG. 12.

At 1815, the method may include receiving, from the UE, an uplink transmission in accordance with the activation configuration message. The operations of 1815 may be performed in accordance with examples as disclosed herein. In some examples, aspects of the operations of 1815 may be performed by an uplink transmission manager 1235 as described with reference to FIG. 12.

Figure 19:
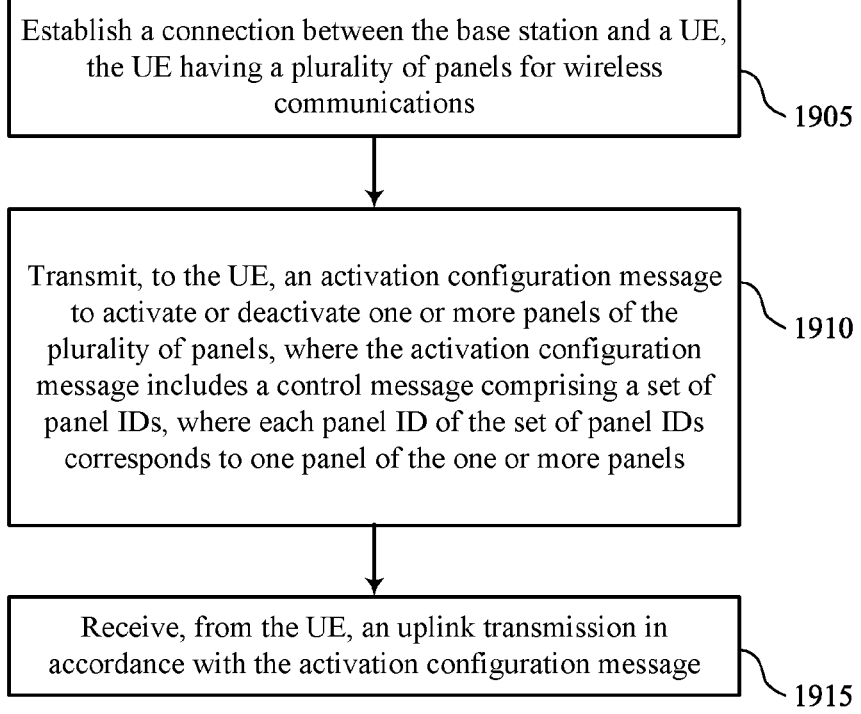

FIG. 19 shows a flowchart illustrating a method 1900 that supports techniques for network-initiated panel activation or deactivation at a UE in accordance with aspects of the present disclosure. The operations of the method 1900 may be implemented by a base station or its components as described herein. For example, the operations of the method 1900 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1905, the method may include establishing a connection between the base station and a UE, the UE having a set of multiple panels for wireless communications. The operations of 1905 may be performed in accordance with examples as disclosed herein. In some examples, aspects of the operations of 1905 may be performed by a connection manager 1225 as described with reference to FIG. 12.

At 1910, the method may include transmitting, to the UE, an activation configuration message to activate or deactivate one or more panels of the set of multiple panels, where the activation configuration message includes a control message including a set of panel IDs, where each panel ID of the set of panel IDs corresponds to one panel of the one or more panels. The operations of 1910 may be performed in accordance with examples as disclosed herein. In some examples, aspects of the operations of 1910 may be performed by a panel activation manager 1230 as described with reference to FIG. 12.

At 1915, the method may include receiving, from the UE, an uplink transmission in accordance with the activation configuration message. The operations of 1915 may be performed in accordance with examples as disclosed herein. In some examples, aspects of the operations of 1915 may be performed by an uplink transmission manager 1235 as described with reference to FIG. 12.

The following provides an overview of aspects of the present disclosure:

Aspect 1: A method for wireless communication at a UE, comprising: establishing a connection between a base station and the UE, the UE having a plurality of panels for wireless communications; receiving, from the base station, an activation configuration message to activate or deactivate one or more panels of the plurality of panels; selecting a subset of the plurality of panels for an uplink transmission based at least in part on the activation configuration message; and transmitting, to the base station, the uplink transmission using the selected subset of the plurality of panels.

Aspect 2: The method of aspect 1, wherein receiving the activation configuration message comprises: receiving a control message comprising a bit field for each of the one or more panels, wherein each bit field comprises one of a bit for activating a respective panel of the one or more panels or a bit for deactivating a respective panel of the one or more panels.

Aspect 3: The method of aspect 1, wherein receiving the activation configuration message comprises: receiving a control message comprising a single bit field for the one or more panels, wherein the bit field comprises one of a bit for activating the one or more panels or a bit for deactivating the one or more panels.

Aspect 4: The method of aspect 1, wherein receiving the activation configuration message comprises: receiving a first control message comprising a set of activation codepoints or a set of deactivation codepoints, wherein each codepoint of the set of activation codepoints or the set of deactivation codepoints is mapped to at least one panel of the one or more panels.

Aspect 5: The method of aspect 4, further comprising: receiving, before receiving the first control message, a second control message indicating the mapping between each codepoint of the set of activation codepoints or the set of deactivation codepoints and the at least one panel of the one or more panels.

Aspect 6: The method of any of aspect 1, wherein receiving the activation configuration message comprises: receiving a control message comprising a set of panel IDs, wherein each panel ID of the set of panel IDs corresponds to a panel of the one or more panels.

Aspect 7: The method of any of aspects 1 through 6, further comprising: receiving a second activation configuration message to activate one or more second panels different from the one or more panels; and deactivating the one or more panels based at least in part on the second activation configuration message.

Aspect 8: The method of any of aspects 1 through 7, further comprising: communicating with the base station using a first BWP, wherein the activation configuration message is received over the first BWP; switching from communicating with the base station using the first BWP to the communicating with the base station using a second BWP; and selecting a second subset of the plurality of panels for a second uplink transmission using the second BWP based at least in part on the activation configuration message.

Aspect 9: The method of any of aspects 1 through 7, further comprising: communicating with the base station using a first BWP, wherein the activation configuration message is received over the first BWP; switching from communicating with the base station using the first BWP to the communicating with the base station using a second BWP; receiving a second activation configuration message to activate or deactivate one or more second panels of the plurality of panels, wherein the second activation configuration message is received over the second BWP; and selecting a second subset of the plurality of panels for a second uplink transmission using the second BWP based at least in part on the second activation configuration message.

Aspect 10: The method of aspect 9, further comprising: switching from communicating with the base station using the second BWP to communicating with the base station using the first BWP; and selecting a third subset of the plurality of panels for a third uplink transmission using the first BWP based at least in part on the activation configuration message.

Aspect 11: The method of any of aspects 1 through 10, further comprising: receiving a control message indicating a set of CCs of a group of serving cells configured for the UE, wherein the activation configuration message comprises a message to activate or deactivate the one or more panels when communicating using a CC of the set of CCs; and communicating with the base station using the CC of the set of CCs and the selected subset of the plurality of panels of the plurality of panels based at least in part on the activation configuration message.

Aspect 12: The method of any of aspects 1 through 11, wherein the activation configuration message comprises an RRC message, a MAC-CE, or a DCI message.

Aspect 13: A method for wireless communication at a base station comprising: establishing a connection between the base station and a UE, the UE having a plurality of panels for wireless communications; transmitting, to the UE, an activation configuration message to activate or deactivate one or more panels of the plurality of panels; and receiving, from the UE, an uplink transmission in accordance with the activation configuration message.

Aspect 14: The method of aspect 13, wherein transmitting the activation configuration message transmitting a control message comprising a bit field for each of the one or more panels, wherein each bit field comprises one of a bit for activating a respective panel of the one or more panels or a bit for deactivating a respective panel of the one or more panels.

Aspect 15: The method of aspect 13, wherein transmitting the activation configuration message comprises: transmitting a control message comprising a single bit field for the one or more panels, wherein the single bit field comprising one of a bit for activating the one or more panels or a bit for deactivating the one or more panels.

Aspect 16: The method of aspect 13, wherein transmitting the activation configuration message comprises: transmitting a first control message comprising a set of activation codepoints or a set of deactivation codepoints, wherein each codepoint of the set of activation codepoints or the set of deactivation codepoints is mapped to at least one panel of the one or more panels.

Aspect 17: The method of aspect 16, further comprising: transmitting, before transmitting the first control message, a second control message indicating the mapping between each codepoint of the set of activation codepoints or the set of deactivation codepoints and the at least one panel of the one or more panels.

Aspect 18: The method of aspect 13, wherein transmitting the activation configuration message comprises: transmitting a control message comprising a set of panel IDs, wherein each panel ID of the set of panel IDs corresponds to one panel of the one or more panels.

Aspect 19: The method of any of aspects 13 through 18, further comprising: transmitting a second activation configuration message to activate one or more second panels different from the one or more panels; and receiving a second uplink transmission from the UE in accordance with the second activation configuration message.

Aspect 20: The method of any of aspects 13 through 19, further comprising: communicating with the UE using a first BWP, wherein the activation configuration message is transmitted over the first BWP; switching from communicating with the UE using the first BWP to communicating with the UE using a second BWP; and receiving a second uplink transmission in accordance the activation configuration message.

Aspect 21: The method of any of aspects 13 through 19, further comprising: communicating with the UE using a first BWP, wherein the activation configuration message is transmitted over the first BWP; switching from communicating with the UE using the first BWP to communicating with the UE using a second BWP; transmitting a second activation configuration message to activate or deactivate one or more second panels of the plurality of panels, wherein the second activation configuration message is received over the second BWP; and receiving a second uplink transmission in accordance with the second activation configuration message.

Aspect 22: The method of aspect 21, further comprising: switching from communicating with the UE using the second BWP to communicating with the UE using the first BWP; and receiving a third uplink transmission from the UE in accordance with the activation configuration message.

Aspect 23: The method of any of aspects 13 through 22, further comprising: transmitting a control message indicating a set of CCs of a group of serving cells configured for the UE, wherein the activation configuration message comprises a message to activate or deactivate the one or more panels when communicating with the base station using a CC of the set of CCs; and communicating with the UE using the CC of the set of CCs in accordance with the activation configuration message.

Aspect 24: The method of any of aspects 13 through 23, wherein the activation configuration message comprises an RRC message, a MAC-CE, or a DCI message.

Aspect 25: An apparatus for wireless communication at a UE, comprising a processor; memory coupled with the processor; and instructions stored in the memory and executable by the processor to cause the apparatus to perform a method of any of aspects 1 through 12.

Aspect 26: An apparatus for wireless communication at a UE, comprising at least one means for performing a method of any of aspects 1 through 12.

Aspect 27: A non-transitory computer-readable medium storing code for wireless communication at a UE, the code comprising instructions executable by a processor to perform a method of any of aspects 1 through 12.

Aspect 28: An apparatus comprising a processor; memory coupled with the processor; and instructions stored in the memory and executable by the processor to cause the apparatus to perform a method of any of aspects 13 through 24.

Aspect 29: An apparatus comprising at least one means for performing a method of any of aspects 13 through 24.

Aspect 30: A non-transitory computer-readable medium storing code the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

establishing a connection between a network device and the UE, the UE having a plurality of panels for wireless communications;

receiving, from the network device, via a first bandwidth part, a first activation configuration message comprising a codepoint corresponding to two or more panels of the plurality of panels;

selecting a first subset of the plurality of panels for an uplink transmission based at least in part on the codepoint mapped to the two or more panels of the plurality of panels;

transmitting, to the network device, the uplink transmission via the first bandwidth part using the first subset of the plurality of panels;

switching from communicating with the network device via the first bandwidth part to communicating with the network device via a second bandwidth part;

suspending the first activation configuration message while switching to communicating with the network device via the second bandwidth part;

receiving a second activation configuration message to activate or deactivate one or more second panels of the plurality of panels, wherein the second activation configuration message is received over the second bandwidth part;

selecting a second subset of the plurality of panels for a second uplink transmission using the second bandwidth part based at least in part on the second activation configuration message;

switching from communicating with the network device via the second bandwidth part to communicating with the network device via the first bandwidth part; and reselecting the first subset of the plurality of panels in accordance with switching back to communicating with the network device via the first bandwidth part and the first activation configuration message.

2. The method of claim 1, wherein receiving the first activation configuration message comprises:

receiving a control message comprising a single bit field for the two or more panels, wherein the bit field comprises one of a bit for activating the two or more panels or a bit for deactivating the two or more panels.

3. The method of claim 1, further comprising:

receiving, before receiving the first activation configuration message, a radio resource control message indicating a mapping between each codepoint of a set of codepoints and one or more panels of the plurality of panels, wherein the first activation configuration message is received via downlink control information, and the codepoint is from the set of codepoints.

4. The method of claim 1, further comprising:

deactivating the two or more panels based at least in part on the second activation configuration message.

5. The method of claim 1, further comprising:

receiving a control message indicating a set of component carriers of a group of serving cells configured for the UE, wherein the first activation configuration message comprises a message to activate or deactivate the two or more panels when communicating using a component carrier of the set of component carriers; and communicating with the network device using the component carrier of the set of component carriers and the first subset of the plurality of panels of the plurality of panels based at least in part on the first activation configuration message.

6. The method of claim 1, wherein the first activation configuration message comprises a radio resource control (RRC) message, a medium access control control element (MAC-CE), or a downlink control information (DCI) message.

7. A method for wireless communication at a network device comprising:

establishing a connection between the network device and a user equipment (UE), the UE having a plurality of panels for wireless communications;

transmitting, to the UE, via a first bandwidth part, a first activation configuration message comprising a codepoint mapped to two or more panels of the plurality of panels;

receiving, from the UE, an uplink transmission via the first bandwidth part in accordance with the codepoint mapped to the two or more panels of the plurality of panels;

switching from communicating with the UE via the first bandwidth part to communicating with the UE via a second bandwidth part;

suspending the first activation configuration message while switching to communicating with the UE via the second bandwidth part;

transmitting, via a second bandwidth part, a second activation configuration message to activate or deactivate one or more second panels of the plurality of panels;

communicating, with the UE, via the second bandwidth part in accordance with the second activation configuration message;

switching from communicating with the UE via the second bandwidth part to communicating with the UE using the first bandwidth part; and communicating with the UE in accordance with the switching back to the first bandwidth part and the first activation configuration message.

8. The method of claim 7, wherein transmitting the first activation configuration message comprises:

42 transmitting a control message comprising a single bit field for the two or more panels, wherein the single bit field comprising one of a bit for activating the two or more panels or a bit for deactivating the two or more panels.

9. The method of claim 7, further comprising:

transmitting, before transmitting the first activation configuration message, a radio resource control message indicating a mapping between each codepoint of a set of codepoints and one or more panels of the plurality of panels, wherein the first activation configuration message is received via downlink control information, and the codepoint is from the set of codepoints.

10. The method of claim 7, wherein the second activation configuration message indicates to activate two or more second panels different from the two or more panels.

11. The method of claim 7, further comprising:

transmitting a control message indicating a set of component carriers of a group of serving cells configured for the UE, wherein the first activation configuration message comprises a message to activate or deactivate the two or more panels when communicating with the network device using a component carrier of the set of component carriers; and communicating with the UE using the component carrier of the set of component carriers in accordance with the first activation configuration message.

12. The method of claim 7, wherein the first activation configuration message comprises a radio resource control (RRC) message, a medium access control control element (MAC-CE), or a downlink control information (DCI) message.

13. An apparatus for wireless communication at a user equipment (UE), comprising:

one or more processors; and one or more memories coupled with the one or more processors storing instructions executable by the one or more processors to cause the apparatus to:

establish a connection between a network device and the UE, the UE having a plurality of panels for wireless communications;

receive, from the network device, via a first bandwidth part, a first activation configuration message to activate or deactivate one or more panels of the plurality of panels;

select a first subset of the plurality of panels for an uplink transmission based at least in part on the first activation configuration message; and transmit, to the network device, the uplink transmission via the first bandwidth part using the first subset of the plurality of panels;

switch from communications with the network device via the first bandwidth part to communications with the network device via a second bandwidth part;

suspend the first activation configuration message while switching to communicating with the network device via the second bandwidth part;

receive a second activation configuration message to activate or deactivate one or more second panels of the plurality of panels, wherein the second activation configuration message is received over the second bandwidth part;

select a second subset of the plurality of panels for a second uplink transmission using the second bandwidth part based at least in part on the second activation configuration message;

switch from communications with the network device via the second bandwidth part to communications with the network device via the first bandwidth part; and reselect the first subset of the plurality of panels in accordance with switching back to communications with the network device via the first bandwidth part and the first activation configuration message.

14. An apparatus for wireless communications at a network device, comprising:

one or more processors; and one or more memories coupled with the one or more processors storing instructions executable by the one or more processors to cause the apparatus to:

establish a connection between the network device and a user equipment (UE), the UE having a plurality of panels for wireless communications;

transmit, to the UE, via a first bandwidth part, a first activation configuration message comprising a codepoint mapped to two or more panels of the plurality of panels; and

receive, from the UE, an uplink transmission via the first bandwidth part in accordance with the codepoint mapped to the two or more panels of the plurality of panels;

switch from communicating with the UE via the first bandwidth part to communicating with the UE via a second bandwidth part;

suspend the first activation configuration message while switching to communicating with the UE via the second bandwidth part;

transmit, via the second bandwidth part, a second activation configuration message to activate or deactivate one or more second panels of the plurality of panels;

communicate, with the UE, via the second bandwidth part in accordance with the second activation configuration message;

switch from communicating with the UE via the second bandwidth part to communicating with the UE using the first bandwidth part; and communicate with the UE in accordance with the switching back to the first bandwidth part and the first activation configuration message.

* * * * *